United States Patent
Affeldt et al.

(10) Patent No.: US 9,910,952 B2
(45) Date of Patent: Mar. 6, 2018

(54) HIERARCHICALLY AWARE INTERIOR PINNING FOR LARGE SYNTHESIS BLOCKS

(71) Applicant: International Business Machines Corporation, Armonk, NY (US)

(72) Inventors: Matthew D. Affeldt, Warren, MI (US); Christopher J. Berry, Hudson, NY (US); Randall J. Darden, Ridgedale, MO (US); Shyam Ramji, Lagrangeville, NY (US); Eddy St. Juste, Bridgeport, CT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/198,954

(22) Filed: Jun. 30, 2016

(65) Prior Publication Data
US 2018/0004885 A1    Jan. 4, 2018

(51) Int. Cl.
*G06F 17/50*    (2006.01)

(52) U.S. Cl.
CPC ................. *G06F 17/5077* (2013.01)

(58) Field of Classification Search
CPC .................................. G06F 17/5077
USPC .......................................... 716/130
See application file for complete search history.

(56) References Cited

U.S. PATENT DOCUMENTS

| | | | |
|---|---|---|---|
| 7,120,892 B1 | 10/2006 | Knol et al. | |
| 7,269,815 B2 | 9/2007 | Wein et al. | |
| 2003/0163795 A1* | 8/2003 | Morgan | G06F 17/5068 716/114 |
| 2005/0076319 A1 | 4/2005 | Chow et al. | |
| 2005/0183054 A1* | 8/2005 | Wein | G06F 17/5072 716/105 |
| 2006/0010414 A1* | 1/2006 | Lee | G06F 17/505 716/114 |
| 2009/0254874 A1* | 10/2009 | Bose | G06F 17/5068 716/113 |
| 2010/0001763 A1* | 1/2010 | Kobayashi | G06F 17/5072 326/102 |
| 2012/0180017 A1* | 7/2012 | Kucar | G06F 17/5072 716/129 |
| 2015/0363531 A1* | 12/2015 | Fricke | G06F 17/5072 716/135 |
| 2017/0011163 A1* | 1/2017 | Berry | G06F 17/5081 |
| 2017/0132349 A1* | 5/2017 | Berry | G06F 17/5072 |

OTHER PUBLICATIONS

Altera Corporation, [online]; [retrieved on May 9, 2016]; retrieved from the Internet http://extras.springer.com/2001/978-0-306-47635-8/an/an161.pdf ."Using the LogicLock Methodology in the Quartus II Design Software," Dec. 2002, 39p.

* cited by examiner

*Primary Examiner* — Suchin Parihar
(74) *Attorney, Agent, or Firm* — Cantor Colburn LLP

(57) ABSTRACT

A system and a computer implemented method for interior pinning in a macro block of an integrated circuit are provided. The method includes receiving child level information of the macro block including at least a location of a logic leaflet, receiving parent level information including at least edge direction information for pin connection and routing resource values of each slot of the macro block at each metal layer, and selecting a pin location based on the child level information and the parent level information.

20 Claims, 20 Drawing Sheets

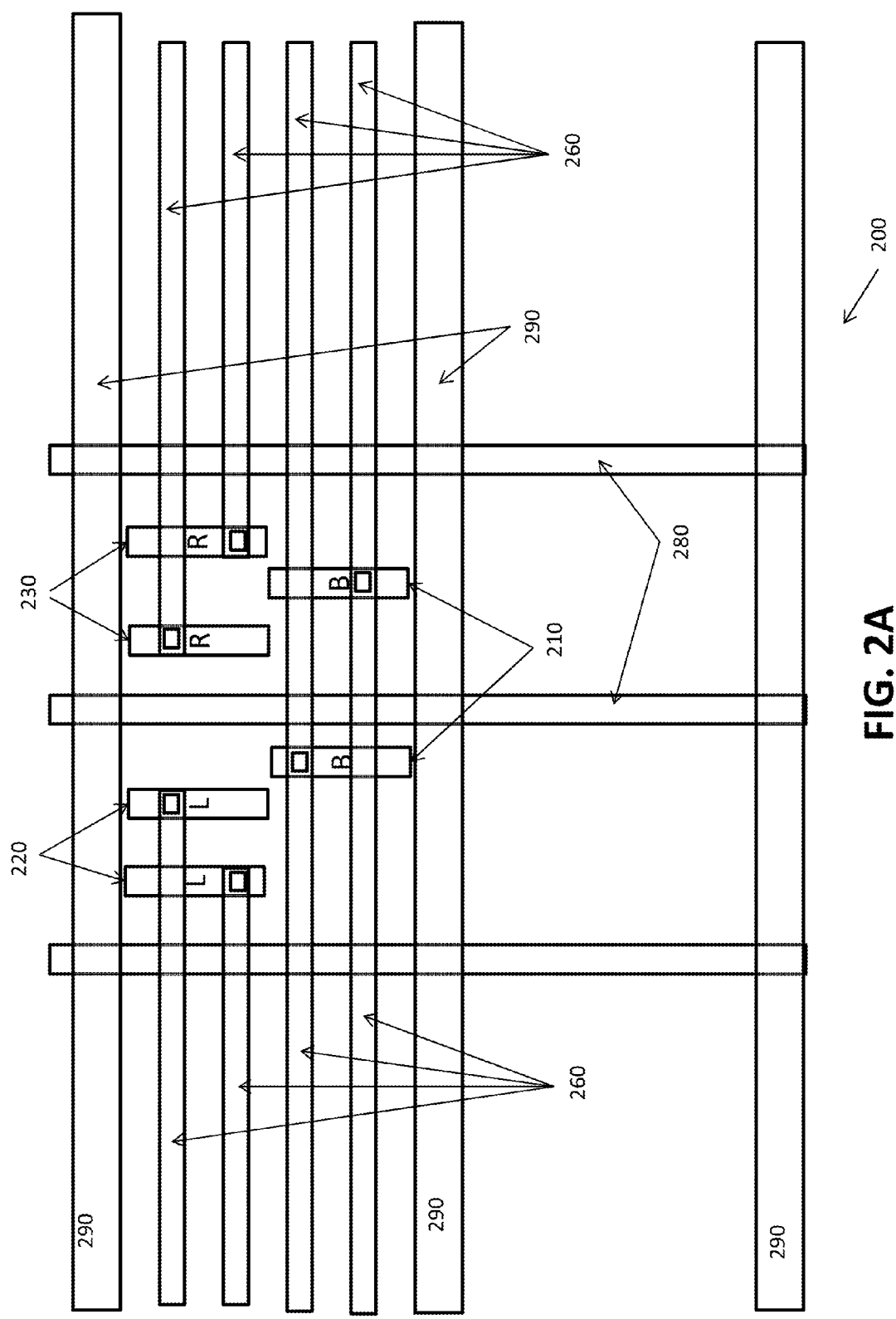

HIERARCHICALLY AWARE INTERIOR PINNING FOR LARGE SYNTHESIS BLOCKS

BACKGROUND

The present disclosure relates generally to interior pinning for large synthesis macro blocks and, more specifically, to a hierarchically aware interior pinning.

Large Synthesis Blocks (LBS) are able to create pinning solutions that are best for their own internal logic, while their hierarchical parents are able to create a pinning solution best suited for its needs.

Particularly, internal information and specifications about the child level architecture of the internal portion of a macro block can be collected and used to select a pinning solution that complements the particular internal structure of the macro block. For example, pins can be placed that allow for internal reduction of wire length and usage as well as improved signal transmittance speed. Alternatively, when connecting one macro block to another macro block or to other devices at a parent level there are provided methods and systems that allow for pinning solutions to be implemented that provide benefits and connection solutions that take into account consideration and information related to the parent level. For example, a macro block may adjust edge pinning to best connect that macro to other macros or devices on an integrated circuit. Thus, child consideration can be taken into account for the internal pinning and then after that is complete one can then provide an additional layer of edge pinning and wiring adjustments to potentially help connect with the parent layer However, although there are a multiple of each type of pinning approaches known, there is not a balancing provided between the two but rather one must select between one or the other or one and then the other. Accordingly, there is a desire for an approach and design that can bridge the gap to create a solution that takes both the child and parent's needs into consideration before computing a pinning solution.

SUMMARY

According to an embodiment, a computer implemented method for interior pinning in a macro block of an integrated circuit is provided. The method includes receiving child level information of the macro block including at least a location of a logic leaflet, receiving parent level information including at least edge direction information for pin connection and routing resource values of each slot of the macro block at each metal layer, and selecting a pin location based on the child level information and the parent level information.

In addition to one or more of the features described above, or as an alternative, further embodiments may include, wherein selecting the pin location based on the child level information and the parent level information includes selecting the pin location for a pin that is configured to connect to both east end and west end of the macro block of the integrated circuit.

In addition to one or more of the features described above, or as an alternative, further embodiments may include, wherein selecting the pin location based on the child level information and the parent level information further includes selecting pin locations for all pins that are configured to connect to the west end of the macro block using a metal layer that extends left from the pin to the west end.

In addition to one or more of the features described above, or as an alternative, further embodiments may include, wherein selecting pin locations for all pins that are configured to connect to the west end of the macro block using a metal layer that extends left from the pin to the west end includes identifying pins that are configured to connect to the west end, identifying a distance from the west end to each pin, generating a pin order, wherein the pins are listed furthest pin from the west end first to nearest pin to the west end last, and selecting pin locations for the pins in the order listed in the pin order.

In addition to one or more of the features described above, or as an alternative, further embodiments may include, wherein selecting the pin location based on the child level information and the parent level information further includes selecting pin locations for all pins that are configured to connect to the east end of the macro block using a metal layer that extends right from the pin to the east end.

In addition to one or more of the features described above, or as an alternative, further embodiments may include, wherein selecting pin locations for all pins that are configured to connect to the east end of the macro block using a metal layer that extends right from the pin to the east end includes identifying pins that are configured to connect to the east end, identifying a distance from the east end to each pin, generating a pin order, wherein the pins are listed further pin from the east end first to nearest pin to the east end last, and selecting pin locations for the pins in the order listed in the pin order.

In addition to one or more of the features described above, or as an alternative, further embodiments may include, wherein selecting the pin location based on the child level information and the parent level information includes determining an ideal pin placement based on the logic leaflet location, wherein the ideal pin placement is directly above the logic leaflet location, determining a nearest available pin slot in relation to the ideal pin placement, wherein the nearest available pin slot is an empty slot with available routing resources between the slot and a macro edge that the pin to be placed requires that is nearest the ideal pin placement, and selecting the nearest available pin slot as the pin location for the pin to be placed.

In addition to one or more of the features described above, or as an alternative, further embodiments may include computing placement of the pin in the pin location, and computing wiring of the pin to a desired edge of the macro block.

In addition to one or more of the features described above, or as an alternative, further embodiments may include tracking routing resource values of the child level information as pin assignments are made.

In addition to one or more of the features described above, or as an alternative, further embodiments may include, wherein tracking routing resource values of the child level information as pin assignments are made includes decrementing routing resource count for the slot where the pin is located, and decrementing routing resource count of all slots along a connection path between the pin and the edge of the macro block the pin is configured to connect with.

In addition to one or more of the features described above, or as an alternative, further embodiments may include, wherein decrementing routing resource count for the slot where the pin is located includes decrementing a resource value of each metal layer between the pin and the logic leaflet including the metal layer the pin is located on.

In addition to one or more of the features described above, or as an alternative, further embodiments may include, wherein decrementing routing resource count of all slots along a connection path between the pin and the edge of the macro block the pin is configured to connect with includes decrementing a resource value in each slot along a path to the edge from the pin.

According to another embodiment, a system for interior pinning in a macro block of an integrated circuit is provided. The system includes a memory having computer readable instructions, and a processor configured to execute the computer readable instructions, the computer readable instructions including receiving child level information of the macro block including at least a location of a logic leaflet, receiving parent level information including at least edge direction information for pin connection and routing resource values of each slot of the macro block at each metal layer, and selecting a pin location based on the child level information and the parent level information.

In addition to one or more of the features described above, or as an alternative, further embodiments may include, wherein the computer readable instruction of selecting a pin location based on the child level information and the parent level information further includes selecting the pin location for a pin that is configured to connect to both east end and west end of the macro block of the integrated circuit, selecting pin locations for all pins that are configured to connect to the west end of the macro block using a metal layer that extends left from the pin to the west end, including identifying pins that are configured to connect to the west end, identifying distance from the west end to each pin, generating a pin order, wherein the pins are listed further pin from the west end first to nearest pin to the west end last, and selecting pin locations for the pins in the order listed in the pin order, selecting pin locations for all pins that are configured to connect to the east end of the macro block using a metal layer that extends right from the pin to the east end, including identifying pins that are configured to connect to the east end, identifying distance from the east end to each pin, generating a pin order, wherein the pins are listed further pin from the east end first to nearest pin to the east end last, and selecting pin locations for the pins in the order listed in the pin order.

In addition to one or more of the features described above, or as an alternative, further embodiments may include, wherein the computer readable instruction of selecting a pin location based on the child level information and the parent level information further includes determining an ideal pin placement based on the logic leaflet location, wherein the ideal pin placement is directly above the logic leaflet location, determining a nearest available pin slot in relation to the ideal pin placement, wherein the nearest available pin slot is an empty slot with available routing resources between the slot and a macro edge that the pin to be placed requires that is nearest the ideal pin placement, and selecting the nearest available pin slot as the pin location for the pin to be placed.

In addition to one or more of the features described above, or as an alternative, further embodiments may include computing placement of the pin in the pin location, and computing wiring of the pin to a desired edge of the macro block.

In addition to one or more of the features described above, or as an alternative, further embodiments may include tracking routing resource values of the child level information as pin assignments are made, wherein tracking includes decrementing routing resource count for the slot where the pin is located, and decrementing routing resource count of all slots along a connection path between the pin and the edge of the macro block the pin is configured to connect with.

According to another embodiment, a computer program product for interior pinning in a macro block of an integrated circuit is provided. The computer program product including a computer readable storage medium having program instructions embodied therewith, the program instructions executable by a processor to cause the processor to receive child level information of the macro block including at least a location of a logic leaflet, receive parent level information including at least edge direction information for pin connection and routing resource values of each slot of the macro block at each metal layer, and select a pin location based on the child level information and the parent level information.

In addition to one or more of the features described above, or as an alternative, further embodiments may include program instructions executable by a processor to cause the processor to select the pin location for a pin that is configured to connect to both east end and west end of the macro block of the integrated circuit, select pin locations for all pins that are configured to connect to the west end of the macro block using a metal layer that extends left from the pin to the west end, including identifying pins that are configured to connect to the west end, identifying distance from the west end to each pin, generating a pin order, wherein the pins are listed further pin from the west end first to nearest pin to the west end last, and selecting pin locations for the pins in the order listed in the pin order, select pin locations for all pins that are configured to connect to the east end of the macro block using a metal layer that extends right from the pin to the east end, including identifying pins that are configured to connect to the east end, identifying distance from the east end to each pin, generating a pin order, wherein the pins are listed further pin from the east end first to nearest pin to the east end last, and selecting pin locations for the pins in the order listed in the pin order.

In addition to one or more of the features described above, or as an alternative, further embodiments may include program instructions executable by a processor to cause the processor to determine an ideal pin placement based on the logic leaflet location, wherein the ideal pin placement is directly above the logic leaflet location, determine a nearest available pin slot in relation to the ideal pin placement, wherein the nearest available pin slot is an empty slot with available routing resources between the slot and the macro edge that the pin to be placed requires that is nearest the ideal pin placement, select the nearest available pin slot as the pin location for the pin to be placed, and track routing resource values of the child level information as pin assignments are made, wherein tracking includes decrementing routing resource count for the slot where the pin is located, and decrementing routing resource count of all slots along a connection path between the pin and the edge of the macro block the pin is configured to connect with.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 2A depicts a schematic diagram of an integrated circuit showing power rails and adjusted pinning locations in accordance with one or more embodiments of the present disclosure;

DETAILED DESCRIPTION

Figure 1A:
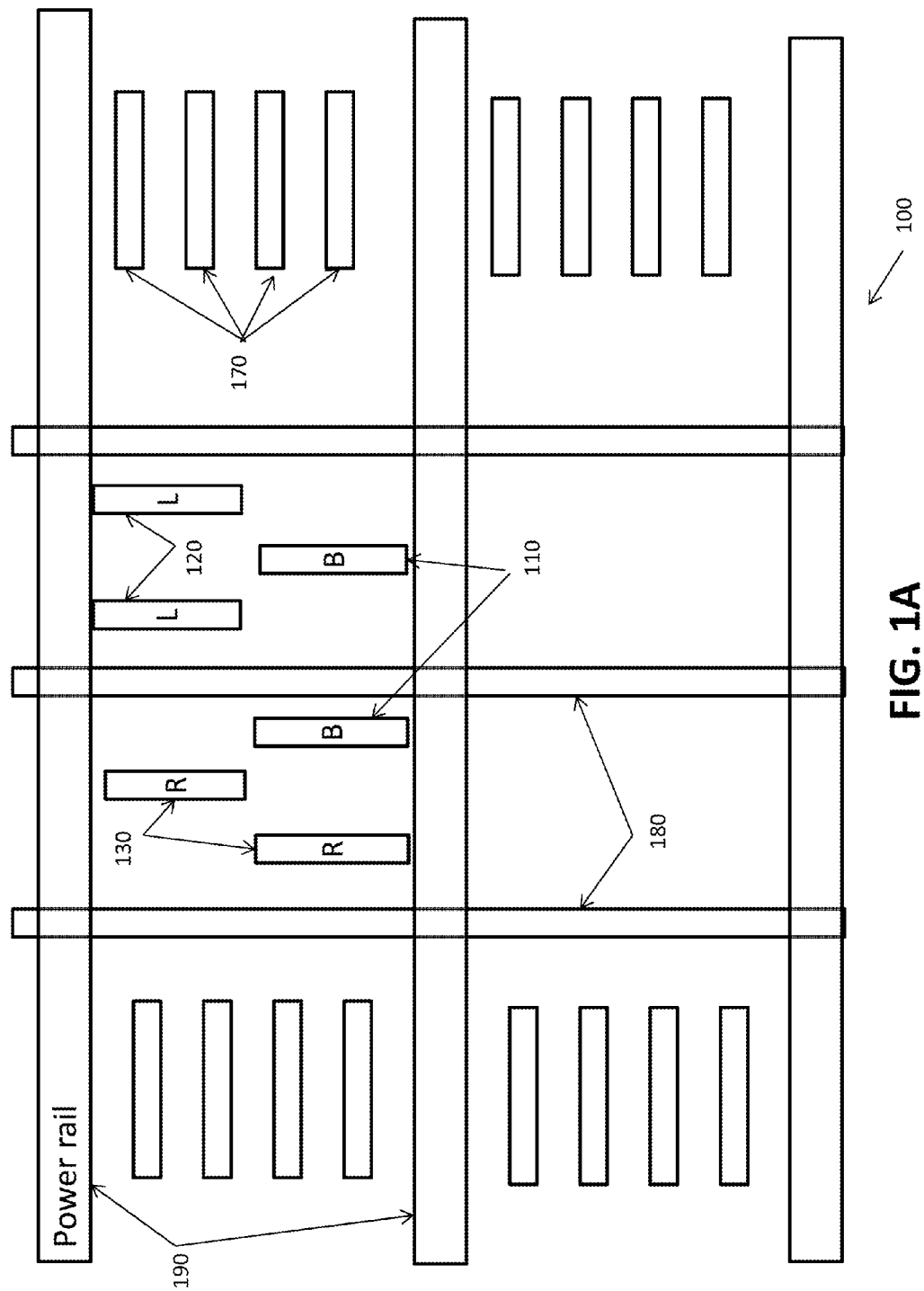
FIG. 1A depicts a schematic diagram of an integrated circuit showing power rails and pinning locations in accordance with one or more embodiments of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

As used in this description a macro block, also called just macro, is a collection of functionality and/or logic within an integrated circuit (IC) chip. Examples of a macro block include but are not limited to a decoder, a mux, or any other sub circuit element that is included on an integrated circuit. A macro block can include one or more logic leaf cells, or logic leaflets, that are components of a macro block. Marco blocks are therefore made up of a plurality of logic leaf cells. A macro block includes child information that defines features and values and contains other information about the macro block specifically. Parent information includes similar information but for the overall integrated circuit and/or takes into account nearby macro blocks. A macro block is a sub component of the IC chip and can include other macro blocks within it or can be contained within larger macro blocks as well. The logic leaflets define the launch points or connecting points for pins that are used to route signal to and from the logic leaflets and/or other macro blocks. These connecting points are ideally located directly above a logic leaflet and are called an ideal pin location to indicate a pin location with the shortest possible connection to the logic leaflet. The logic leaflets define the functionality of a macro block while the pins and signal wires are signal routing elements. For example, the pins are shown in one or more embodiments herewith are used to route signals to parent hierarchical layers outside the current macro child hierarchical component.

Specifically, embodiments described herein are directed to a method and/or system for hierarchically aware interior pinning for Large Synthesis Blocks (LBS). According to one or more embodiments, the method includes providing parent level information, such as routing information, to the child level, particularly the LBS, so that the LBS synthesis can place pins in a mutually acceptable location for both the LBS and the parent, such that both the child and parent pinning concerns are taken into account to create a pinning solution for both the child and the parent, as contrasted to prior art methods which focus on one or the other.

Turning now to the figures, FIG. 1A depicts a schematic diagram of a sub portion of an integrated circuit 100 showing power rails 180, 190 and pinning locations 110, 120, 130 in accordance with one or more embodiments of the present disclosure. As shown the sub portion of the integrated circuit 100 can be called a macro block. A macro block can include a number of logic leaflets as well as the power rails 180, 190, pin location 110, 120, 130 and routing tracks 170 along which connected are made and to the pins locations 110, 120, 130. Further, the power rail 190 that runs east and west can be placed on the same metal layer as the routing tracks 170 while the other power rail 180 is placed on a different metal layer. The routing tracks are the tracks along which a signal wire can be placed that would connect a pin such as pins 110, 120, and/or 130 to an edge of the circuit 100. As shown four routing tracks are provided between power rail lines 190. However, according to other embodiments, this number can be increased substantially or reduced to less than four depending on the macro block architecture.

Further, as shown and in accordance with one or more embodiments, the pin locations 110, 120, and 130 represent ideal pin locations. An ideal pin location is a location that is directly above a logic leaflet that the pin is configured to connect to. However, it can be appreciated that a pin does not necessarily need to be provided directly above the logic leaflet for connection to the logic leaflet. Thus, flexibility as to the location of the pin location is an inherent property of the macro block.

The pin locations 110 represent pin locations for pins that require connection to both the east end and the west end of the macro block along routing tracks 170. The pin locations 120 represent pin locations for pins that require connection to the west end of the macro block only. Further, pin locations 130 represent pin locations for pins that require connection to the east end of the macro block only. As shown, three pin locations can be provided between vertically extending power rails 180, however, more or less pin locations can be provided between the power rails 180 in accordance with one or more embodiments.

Figure 1B:
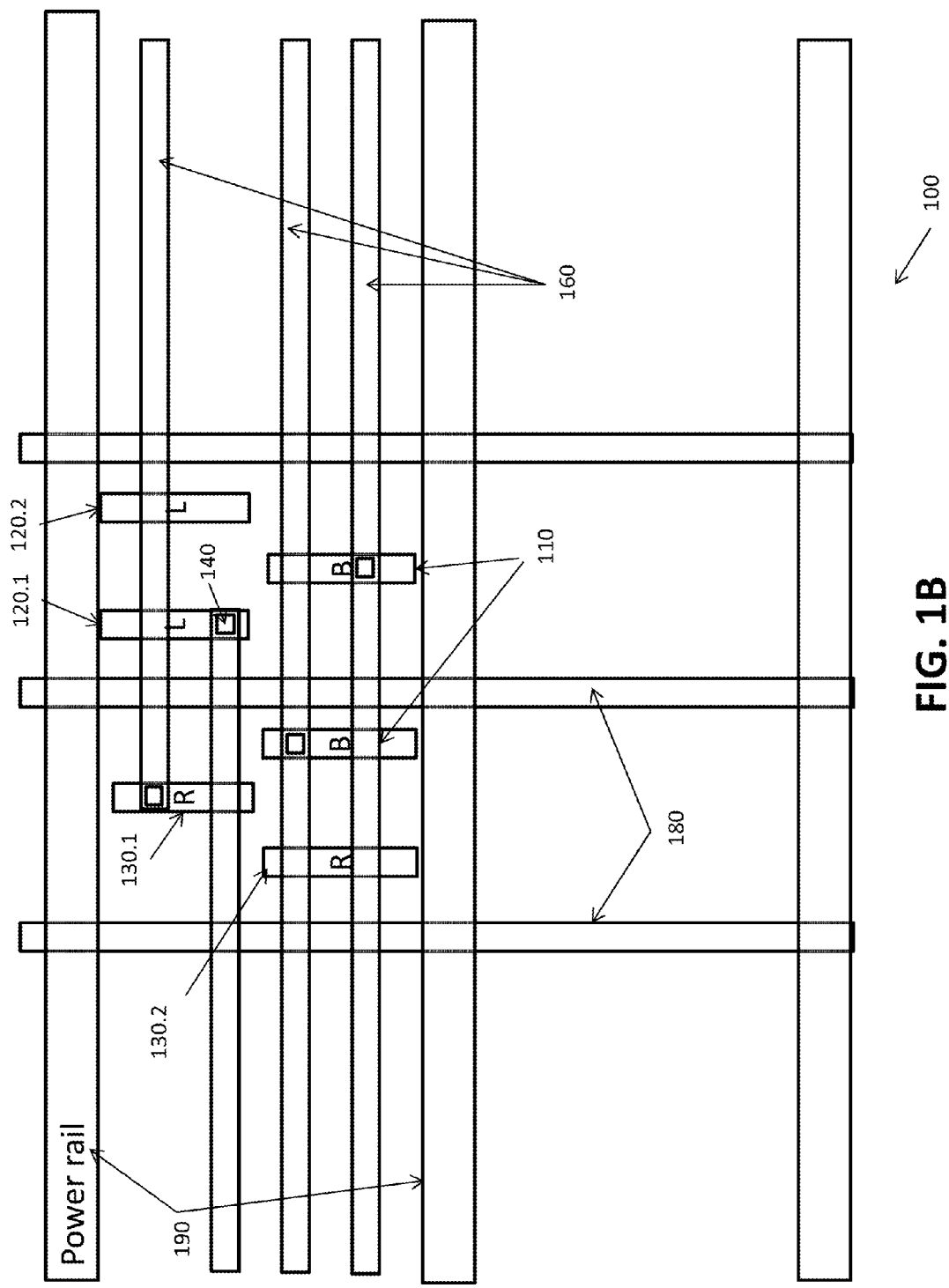
FIG. 1B depicts a schematic diagram of an integrated circuit showing power rails and partially connected pinning locations that are connected without any adjustments in accordance with one or more embodiments of the present disclosure.

FIG. 1B depicts a schematic diagram of a macro block that is a portion of an integrated circuit showing power rails 180, 190 and partially connected pinning locations 110, 120, 130 that are connected without any adjustments in accordance with one or more embodiments of the present disclosure. Particularly, FIG. 1B shows an attempt to connect pins using limited routing tracks in the event that no attempts are made to move or adjust the ideal pin locations. Accordingly, when such an approach is implemented it can be appreciated that some pins will be left unconnected. Specifically, as shown, pins 110 are each connected with a signal wire 160 that extend and connect to both the east end and the west end of the circuit 100. These connected use up half of the provided routing tracks that are provided between power rails 190 in this embodiment. Further, one of the pins 120.1 is connected at a point 140 using one of the remaining routing tracks to a west end using a signal wire 160 extending to the left. Finally, one of the pins 130.1 is connected using the last of the remaining routing tracks to an east end using a signal wire 160 extending to the right. It is important to note that pin 120.2 and 130.2 are left without being connected because of the lack of any viable connection paths. Accordingly, adjustments away from ideal pin locations is implemented as shown in the following figures to provide for connecting of all pins to the desired edge of the macro block within which the pins are being placed.

For example, FIG. 2A depicts a schematic diagram of a macro block 200 that is a portion of an integrated circuit showing power rails 280, 290 and adjusted pinning locations 210, 220, 230 in accordance with one or more embodiments of the present disclosure. Specifically, while the pins 210 that connect to both the east and west ends remained in a similar location as to similar pins shown in FIGS. 1A-1B, the other pins 220 and 230 have been adjusted such that all pins can be connected using an optimal number of routing tracks and signal wires 160. Specifically, as shown, pins 220 that require connections to a west end of the macro block 200 are shifted such that they are both placed west of the other pins 210, 230. Similarly, pins 230 that require connections to an east end of the macro block 200 are shown shifted such that they are east of at least pins 210. Thus, the routing tracks can be used to connect both sets of pins 220 and 230 as shown. Particularly, signal wires 260 can connect pins 220 to the west end along routing tracks that also are able to connect pins 230 to the east end of the macro block 200 as shown.

Figure 2B:
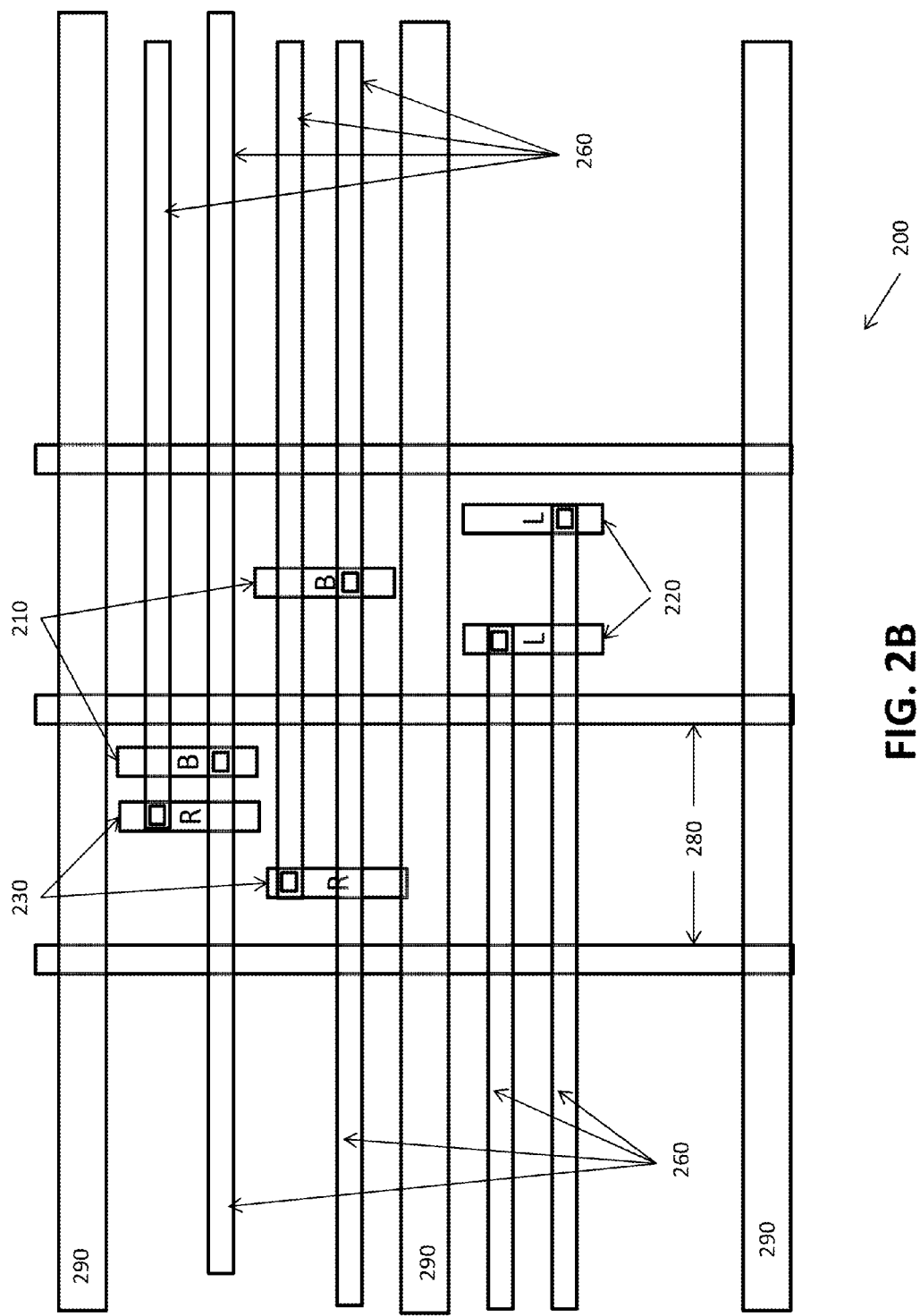
FIG. 2B depicts a schematic diagram of an integrated circuit showing power rails and adjusted pinning locations in accordance with one or more embodiments of the present disclosure.

According to other embodiments, other arrangement of pins can be provided by adjusting the pin locations that provide improved connections that allow for all pins to connect to desired edges. For example, FIG. 2B depicts a schematic diagram of a macro block 200 of an integrated circuit showing power rails 280, 290 and adjusted pinning locations 210, 220, 230 in accordance with one or more embodiments of the present disclosure. Particularly, as shown in this embodiment, the pin locations 210, 220, and 230 can be arranged in a different arrangement that still provided for connecting of all pins to the desired edges of the macro block 200. This embodiment as shown uses a few additional signal wires 260 and routing tracks to connect the pins at pin location 210, 220, and 230 as compared to the embodiment shown in FIG. 2A.

Figure 3C:
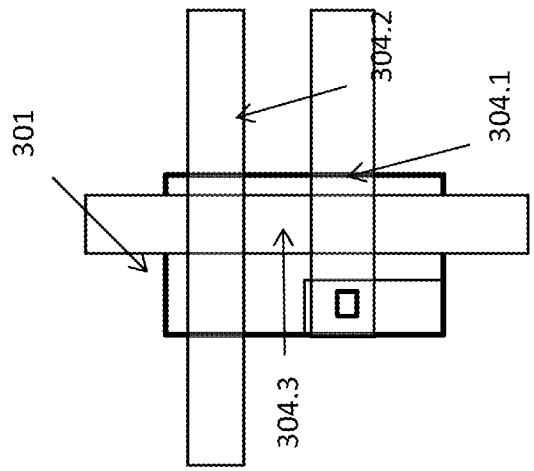
FIGS. 3A, 3B and 3C depict schematic diagrams of a slot that includes a pin location portion and routing portions in accordance with one or more embodiments of the present disclosure.
Figure 3B:
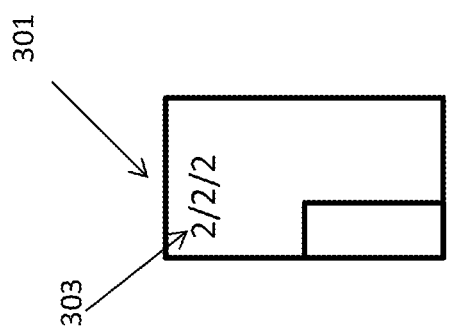
Figure 3A:
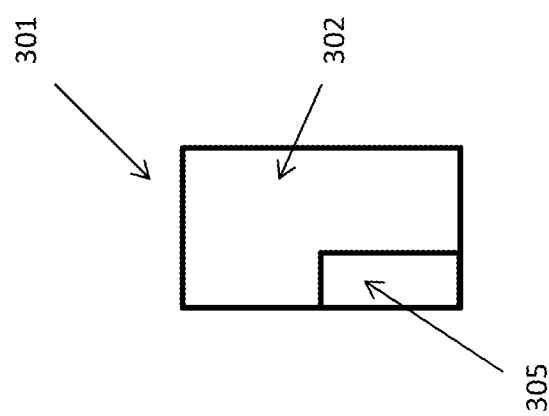

Integrated circuits, and macro blocks of the integrated circuits, can be organized using an architecture that provides a number of slots that provide areas for both the pins and the routing wires within each slot. For example, FIGS. 3A-3C depict schematic diagrams of a block 301 that includes a pin location portion 305 and routing portion 302 in accordance with one or more embodiments of the present disclosure. Specifically, a block 301 as shown in FIG. 3A provides a pin location portion 305 in a southwest region of the overall block 301. The remaining portion of the slot is defined as a routing portion 302. The routing portion 302 provides natural separation between pins as well as space along which routing wires can be run to connect pins to desired edges of the macro block they are a part of. The routing portion 302 of a slot 301 has a limit as to how many signal wires can be provided. This limit defined by the size of the routing portion and size of the routing wires defines the routing resource value 303 of the slot and can be defined for different metal layers in the block 301. For example, as shown slot block in FIG. 3B has the resources available to include two signal wires extending east and west at each of the three layers as indicated by "2/2/2." According to other embodiments, each slot can be provided with more or less routing resources. An example of signal wires traversing a block 301 is shown in FIG. 3C which shows a first signal wire 304.1 and a second signal wire 304.2 extending east and west. Further, according to one or more embodiments, a signal wire 304.3 can extend north and south on a different metal layer than signal wires 304.1 and 304.2.

Figure 4A:
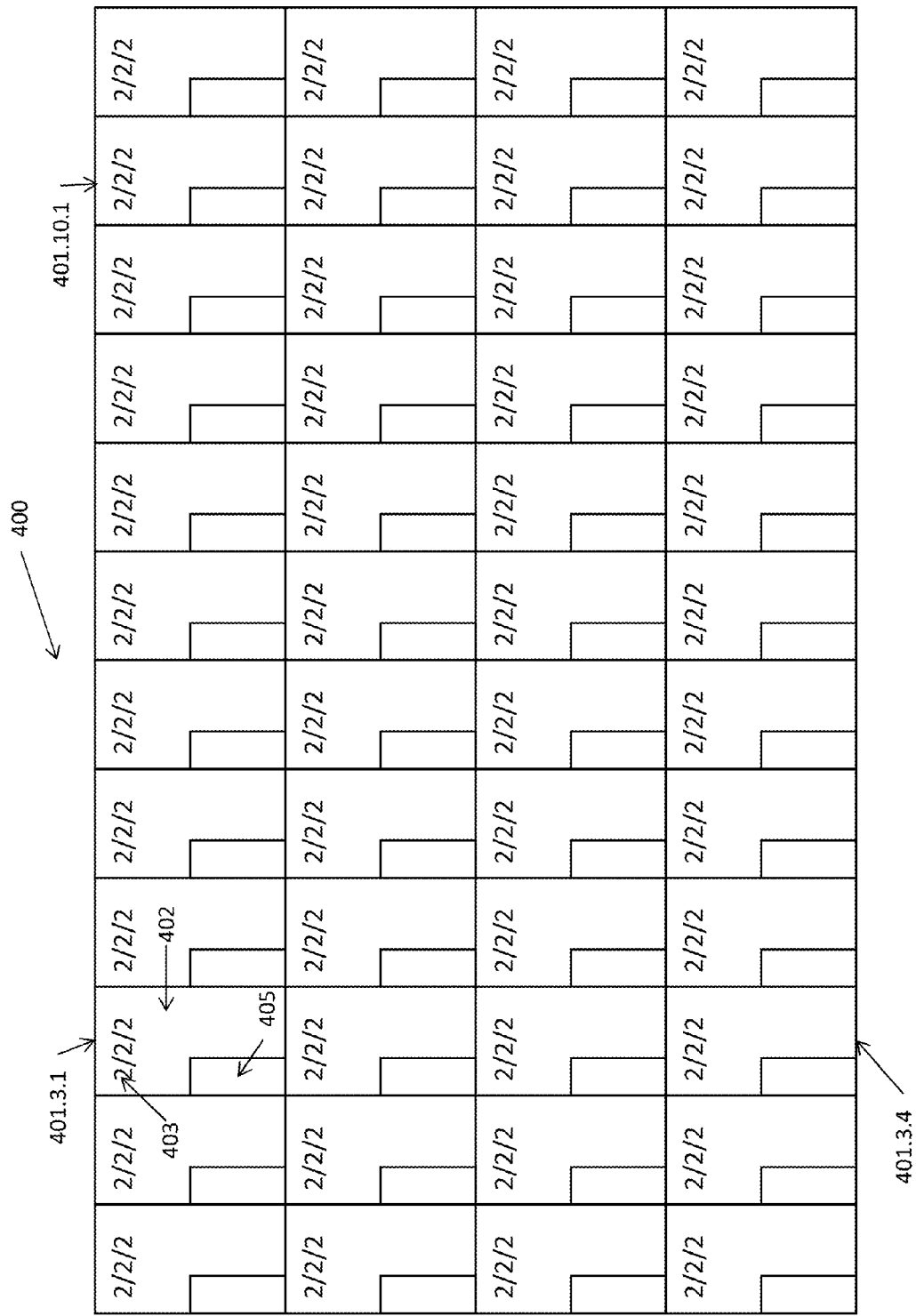
FIG. 4A depicts a macro block that includes an array of slots in accordance with one or more embodiments of the present disclosure.

FIG. 4A depicts a macro block 400 that includes an array of slots in accordance with one or more embodiments of the present disclosure. For example, the macro block 400 includes a slot 401.3.1 (located at: column three, row one) as well as a block 401.3.4 (column three, row four) and a block 401.10.1 (column ten, row one), and so on. As shown, each slot has all their routing resources 403 available as indicated by "2/2/2" indicated within each slot for tracking purposes. Further, each slot in the array of slots is provided with, for example, a pin location portion 405 and a routing portion 402 that makes up the remaining area of the slot.

Figure 4B:
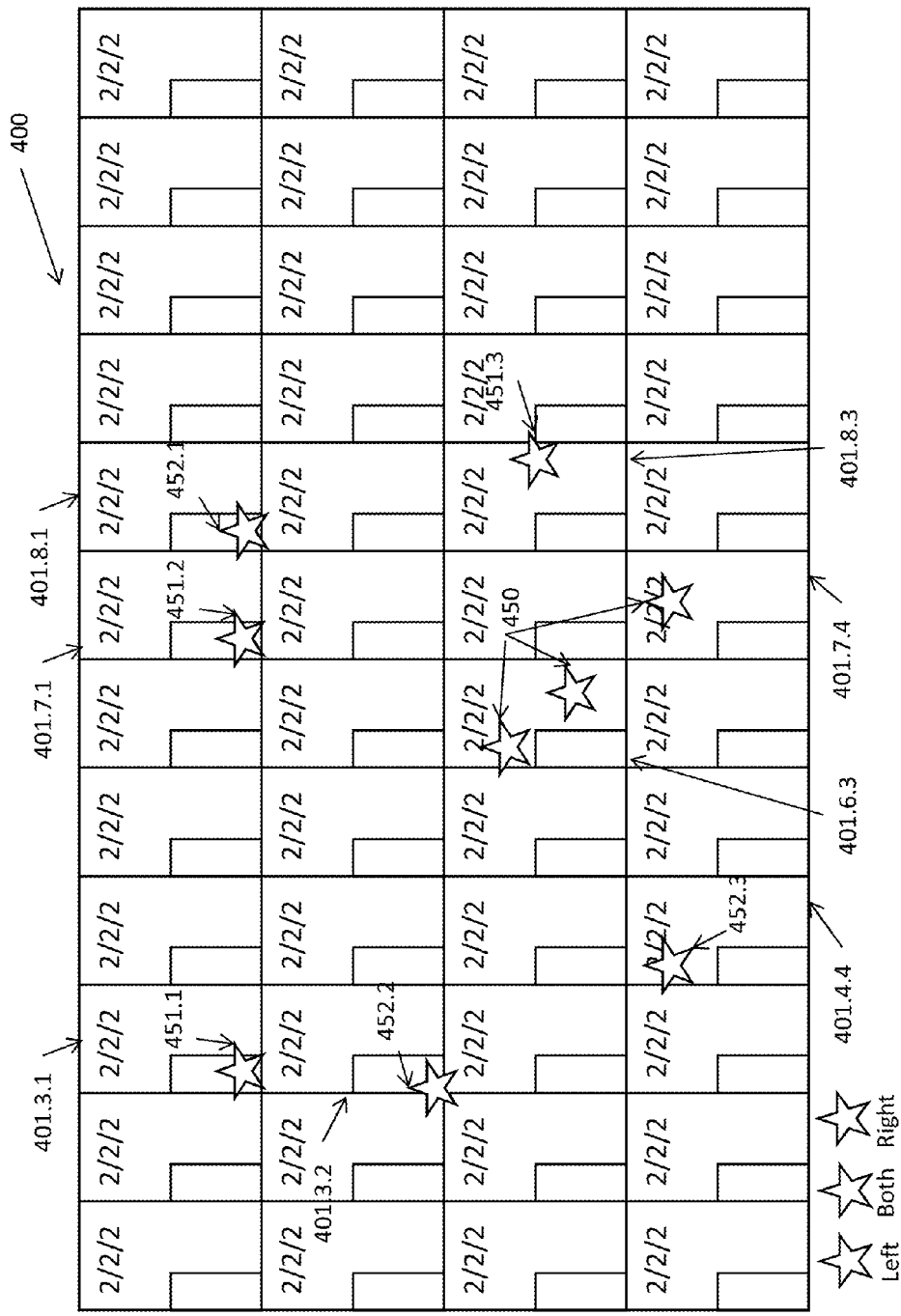
FIG. 4B depicts a macro block that includes an array of slots with ideal pin locations shown in accordance with one or more embodiments of the present disclosure.

FIG. 4B depicts a macro block 400 that includes an array of slots with ideal pin locations shown in accordance with one or more embodiments of the present disclosure. Specifically, ideal pin locations for pins that connect to both ends of the macro block 400 are provided in slots 401.6.3 and 401.7.4 as shown. These ideal dual end connection pin locations 450 are each marked with a star with a dotted pattern. As shown, two of the ideal dual end connection pin locations 450 are provided within a single slot 401.6.3 while the third is provided in slot 401.7.4. Further, the macro block is provided with a first ideal west connecting pin location 452.1 located in slot 401.8.1, a second ideal west connection pin location 452.2 in slot 401.3.2, and a third ideal west connection pin location 452.3 in slot 401.4.4, as shown. Further, the macro block 400 has additional ideal pin locations that are configured to connect to an east end of the macro block. Specifically, the macro block includes a first ideal east connection pin location 451.1 located in slot 401.3.1, a second ideal east connection pin location 451.2 located in slot 401.7.1, and a third ideal east connecting pin location 451.3 located in slot 401.8.3. As shown, the macro block 400 is provided with three of each type of pin location. However, according to other embodiments, any number of each type of east connecting, west connecting, or connecting to both ends type pin locations can be provided.

Figure 5A:
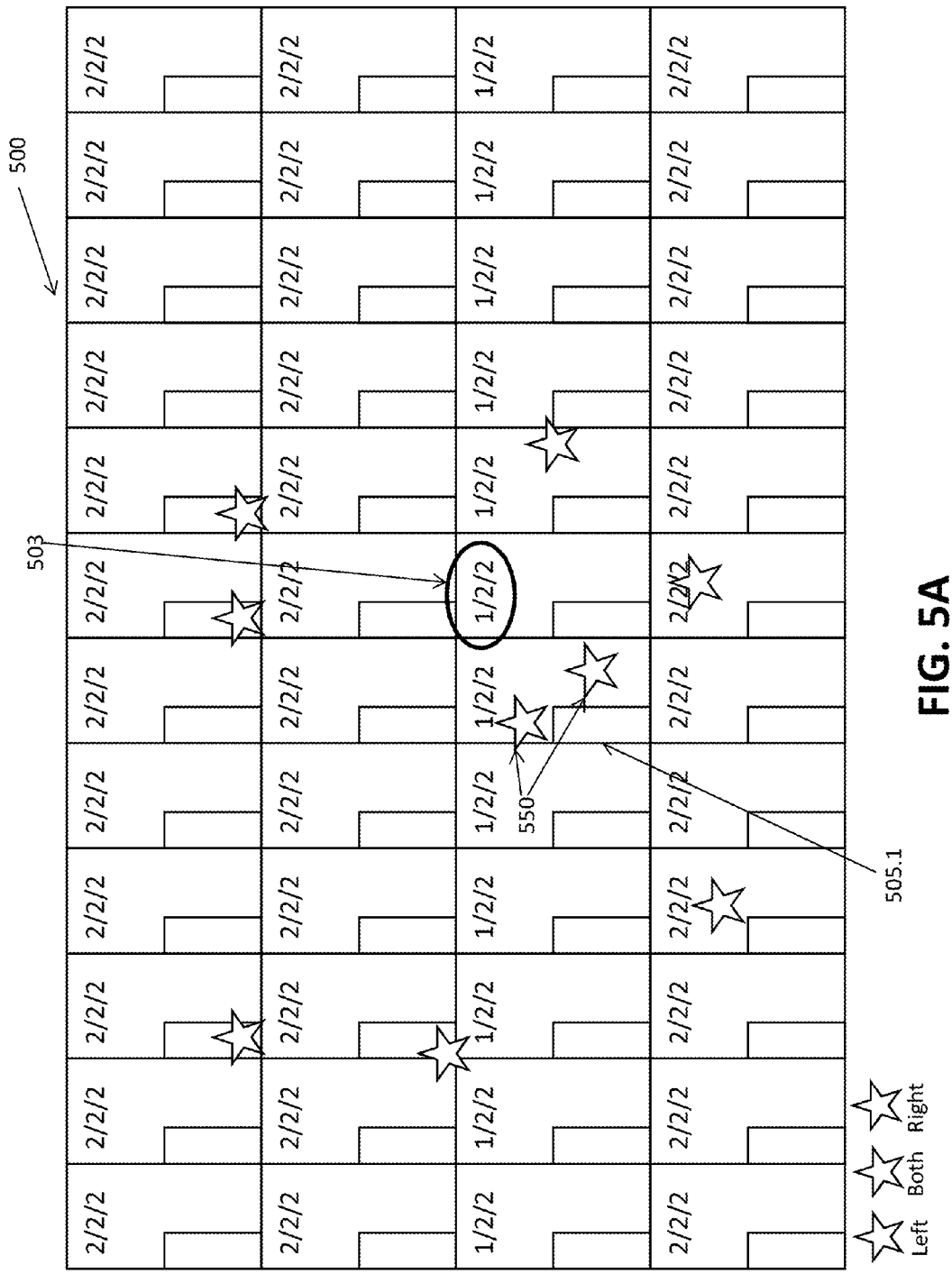
FIGS. 5A, 5B and 5C depict pin placement of pins that connect to the west and east ends of the macro in accordance with one or more embodiments of the present disclosure.
Figure 5B:
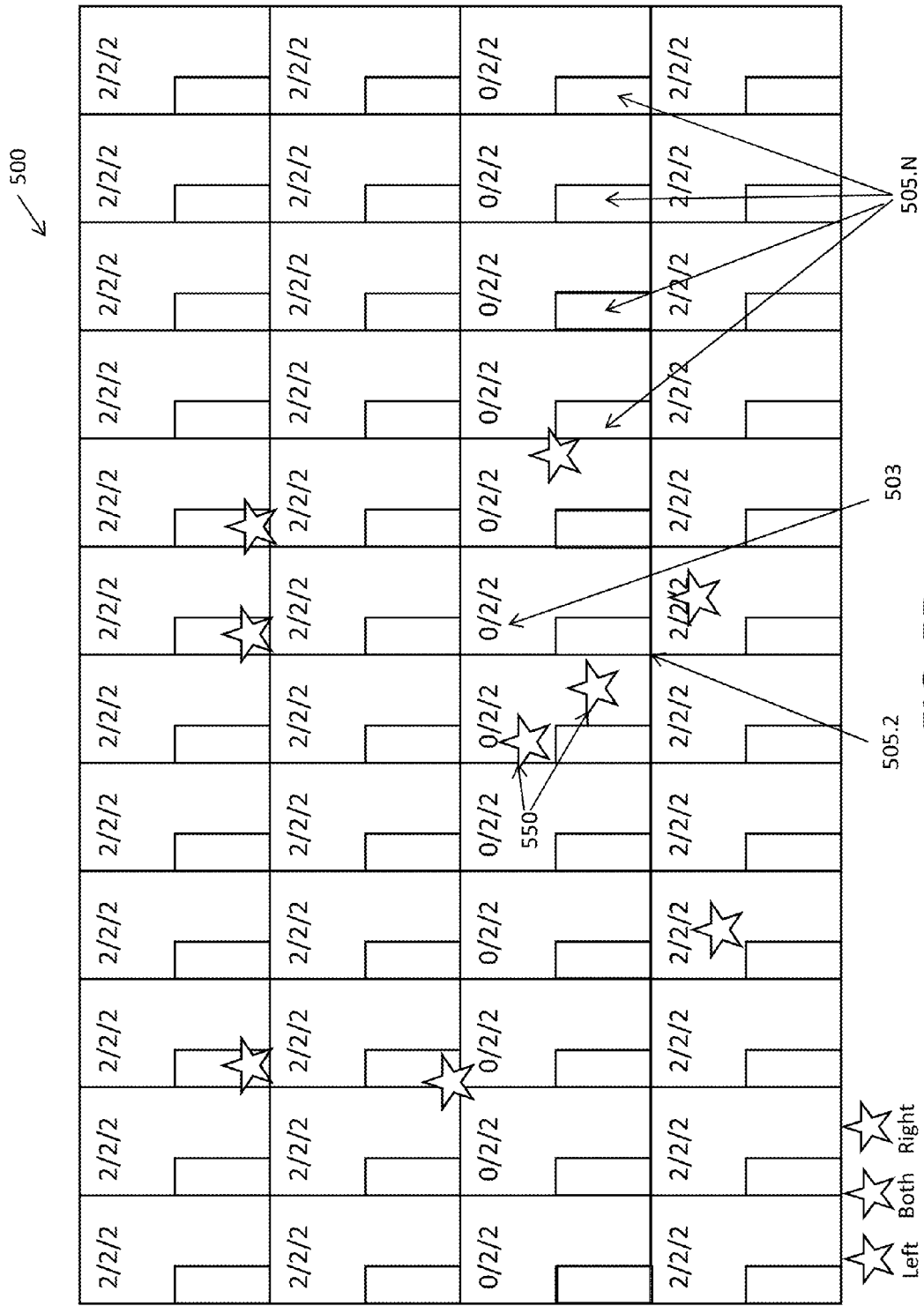
Figure 5C:
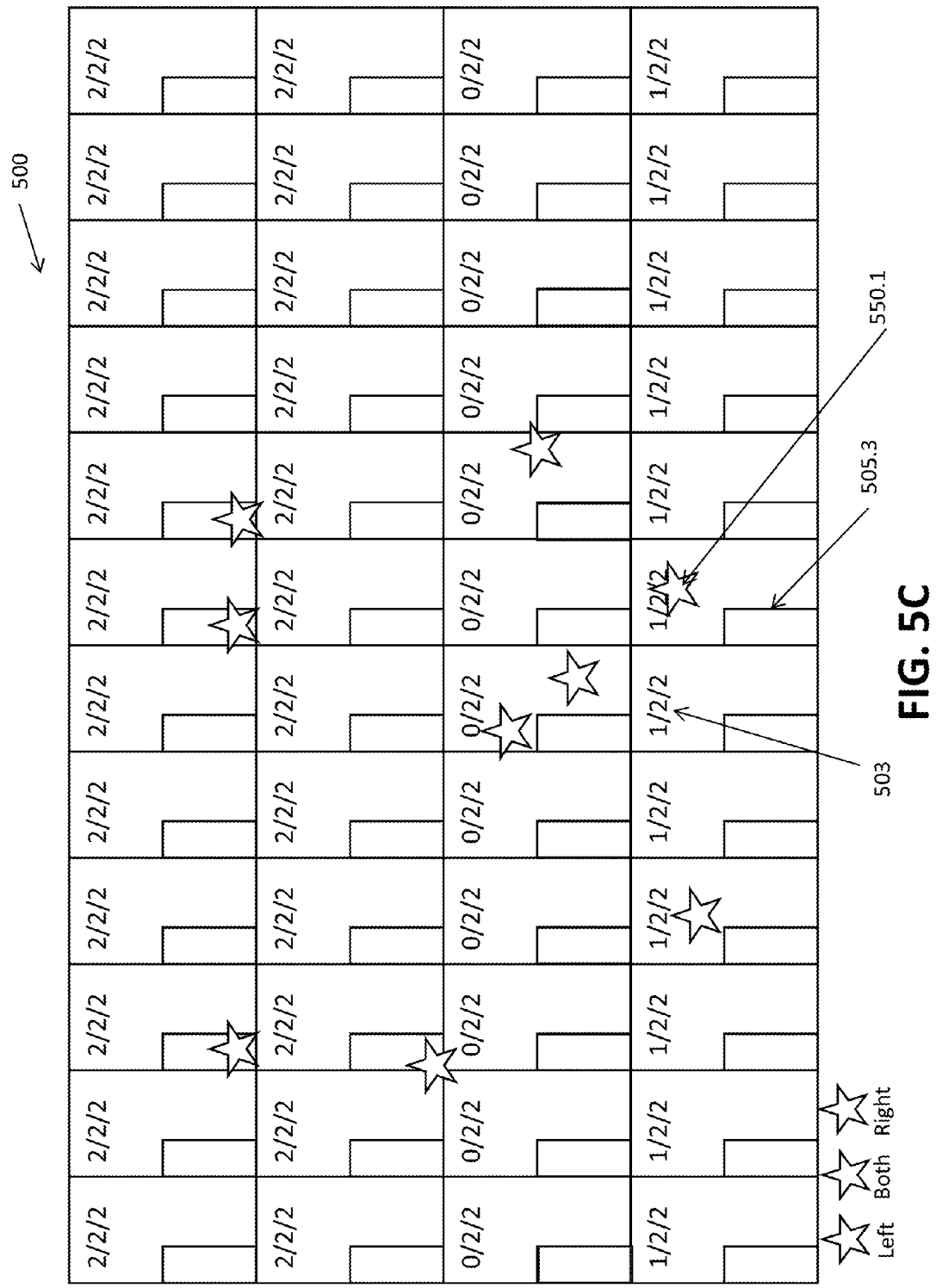

FIGS. 5A-5C depict pin placement of pins that connect to both the west and east ends of the macro 500 in accordance with one or more embodiments of the present disclosure. As shown, the array of slots that make up the macro block 500 include the same resource values as well as ideal pin locations as those shown in FIG. 4B. However, other arrangements can be provided in accordance with one or more embodiments.

Specifically, FIG. 5A shown the initial process of computing the placement of a first pin 505.1 that is configured to connect to both a west and east end of the macro block 500. As shown, the first pin 505.1 is placed in a slot nearest on of the ideal pin locations 550. Once placed, the resource values are adjusted for each slot affected by the placement of the pin 505.1. Particularly, the resource value 503 in the slot the pin is placed is decremented to show the placement of the pin to "1/2/2". Further, the resource values of all slots extending both east and west of that slot are also decremented to "1/2/2" to account for the routing wire that will be placed to connected the pin 505.1 to both the east and west end.

FIG. 5B shows the placement of a second pin 505.2 in a next nearest slot to one of the ideal pin locations 550. Further, once the second pin 505.2 is placed the resource values for all affected slots are adjusted to account for this placement. Specifically, resource value of the slot within which the second pin 505.2 has been placed is adjusted to 0/2/2 indicating that all routing resources on this metal layer of the slot are now being used and/or accounted for. Further, all the remaining resource values of the slots that are east and west of the pin 505.2 are also adjusted to 0/2/2 to account for the signal wire that will extend through them. As shown these slots 505.N are grayed out to indicate that their routing resources have been saturated at this metal layer. This means that these slots cannot support any additional signal wiring passing through them. This also means that these slots cannot support the placement of a pin since such a placement would leave the pin stranded because no routing resources remain to connect the pin. Thus, in future operations these slots are avoided as next nearest available slots for pin placement or routing. Thus, as shown in this embodiment, the third row of this macro block 500 is now saturated after the placement of the first pin 505.1 and the second pin 505.2.

FIG. 5C shows the placement of a third pin 505.3 that is configured to connect to both the east end and the west end of the macro block 500. Particularly, the third pin 505.3 is placed in the slot nearest the ideal pin location 550.1. The routing resource 503 for this slot as well as the other slots in this row are adjusted to 1/2/2 to account for the third pin 505.3 and routing wires that will be added to connect the third pin 505.3.

Figure 6A:
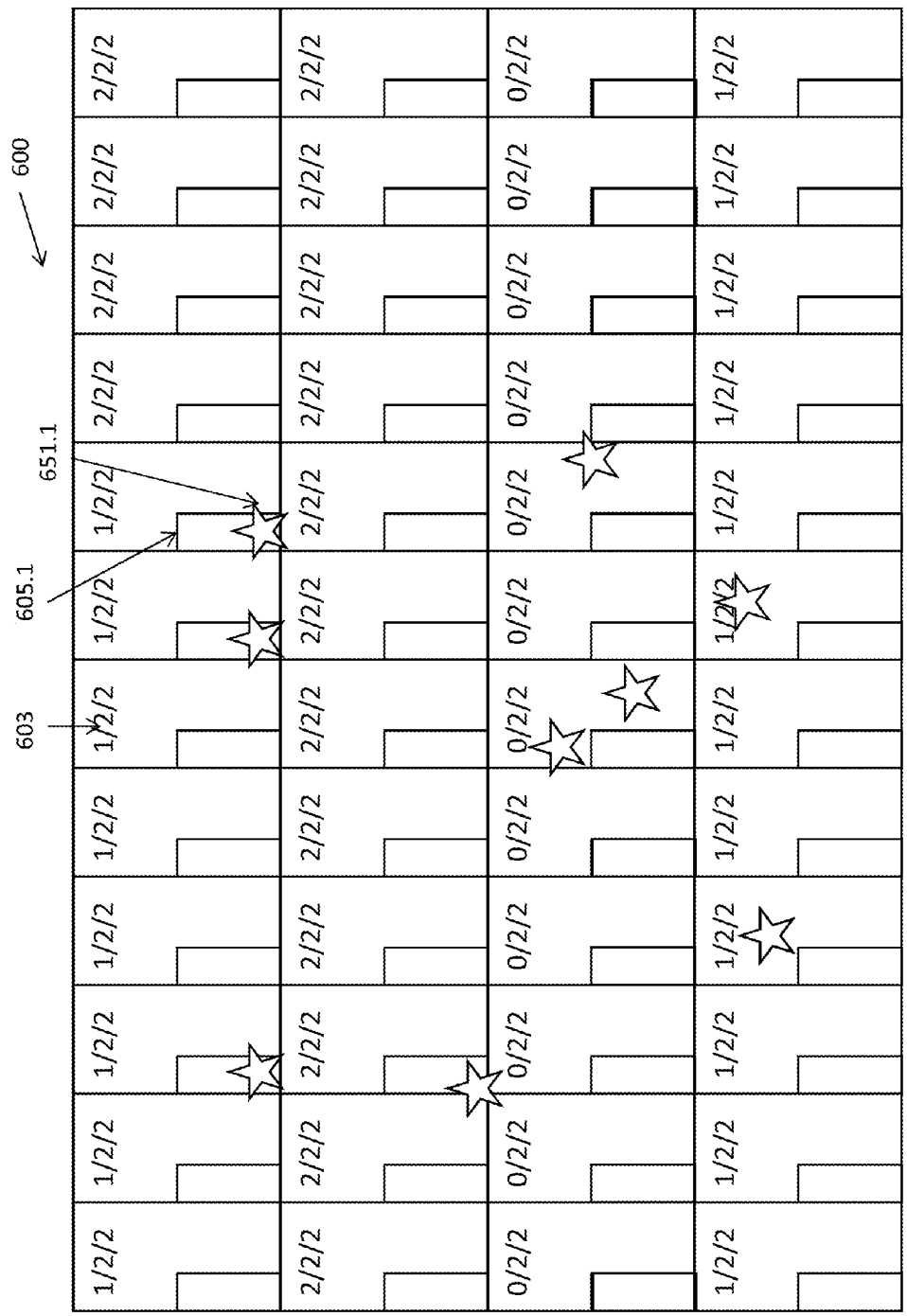
FIGS. 6A, 6B and 6C depict pin placement of pins that connect to a west end of the macro in accordance with one or more embodiments of the present disclosure.
Figure 6B:
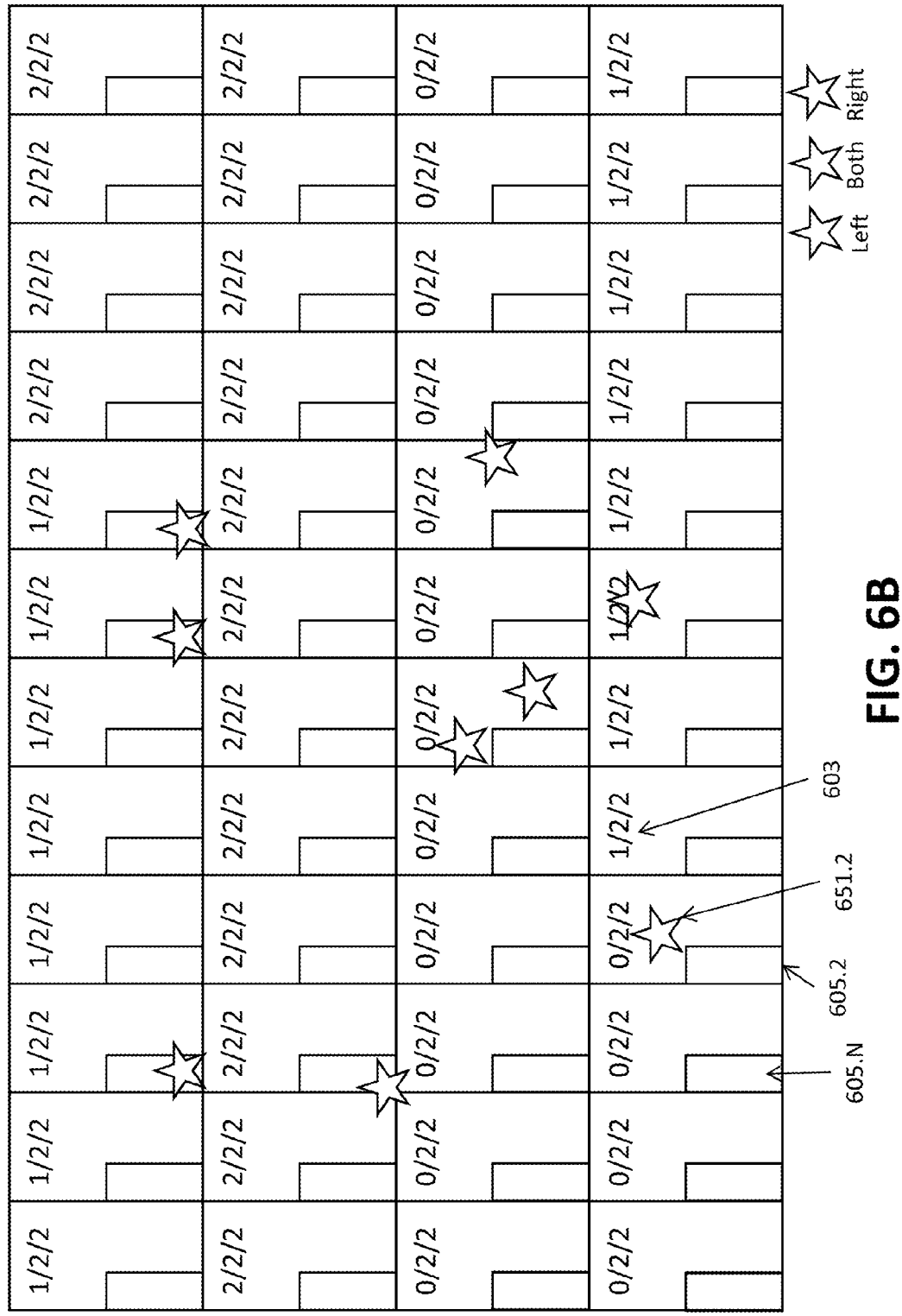
Figure 6C:
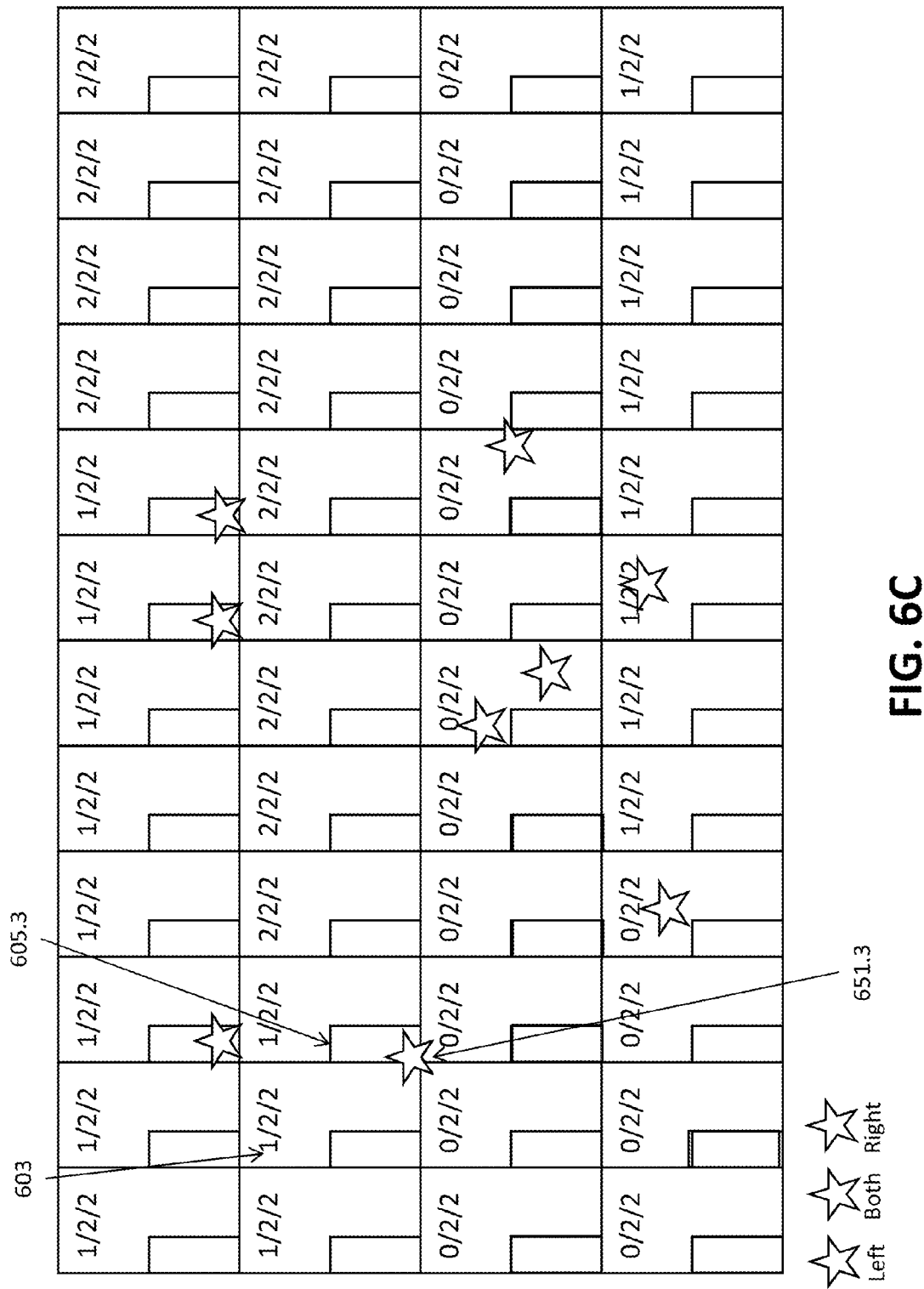

FIGS. 6A-6C depict pin placement of pins that connect to a west end of the macro in accordance with one or more embodiments of the present disclosure. Particularly, after operations are executed to place any pins that connect to both ends of the macro device, the next set of operations deal with computing placement of pins that connect to only one edge of the macro block. Particularly, as shown the pins that connect to the west end are placed next. Alternatively, according to other embodiments, the pins that connect to the east end can be placed next and the west end pins can be placed last. Further, according to other embodiments, the placement of the pins can be intermixed. For example, it is possible to intermix west and east assignments of pins as long as the pin farthest from the pin's target edge is processed next.

Looking at FIG. 6A a fourth pin 605.1 is placed in a pin location of a slot. The fourth pin 605.1 is configured to connect only to the west end of the macro block 600. As shown the fourth pin 605.1 is placed in the slot that is nearest the ideal pin location 651.1. Particularly, in this embodiment, the nearest slot to this ideal pin location 651.1 happens to also be the same slot that where the ideal pin location 651.1 is located. Further, the routing resource values of the affected slots are adjusted in response to the placement of the fourth pin 605.1. Specifically, the routing resource values of the slot that now contains the pin as well as all the slots extending left are adjusted to 1/2/2.

FIG. 6B shows the placement of a fifth pin 605.2 in a slot nearest an ideal pin location 651.2. The routing resources 603 of this slot are adjusted to 0/2/2 which indicates that this slot's routing resources on this metal layer are now saturated. Further, the routing resources of the slots left of the fifth pin 605.2 are also adjusted to 0/2/2 because the fifth pin 605.2 is to be connected using a signal wire to the west end of the macro block 600. Thus, as indicated by being grayed out, slots 605.N are now no longer able to support and pin placement or additional signal wires. The slots that extend to the east end maintain some availability as shown since the signal wiring to the fifth pin 605.2 is only needed in one direction as indicated by the parent information of the fifth pin 605.2 that defines the pin as a west end connecting pin only.

FIG. 6C shows the placement of a sixth pin 605.3 in a slot nearest an ideal pin location 651.3. The routing resources 603 of this slot are adjusted to 1/2/2 which indicates that this slot's routing resources on this metal layer are partially saturated. Further, the routing resources of the slots left of the sixth pin 605.3 are also adjusted to 1/2/2 because the sixth pin 605.3 is to be connected using a signal wire to the west end of the macro block 600. The slots that extend to the east end maintain all availability as shown since the signal wiring to the sixth pin 605.3 is only needed in one direction as indicated by the parent information of the sixth pin 605.3 that defines the pin as a west end connecting pin only.

Figure 7A:
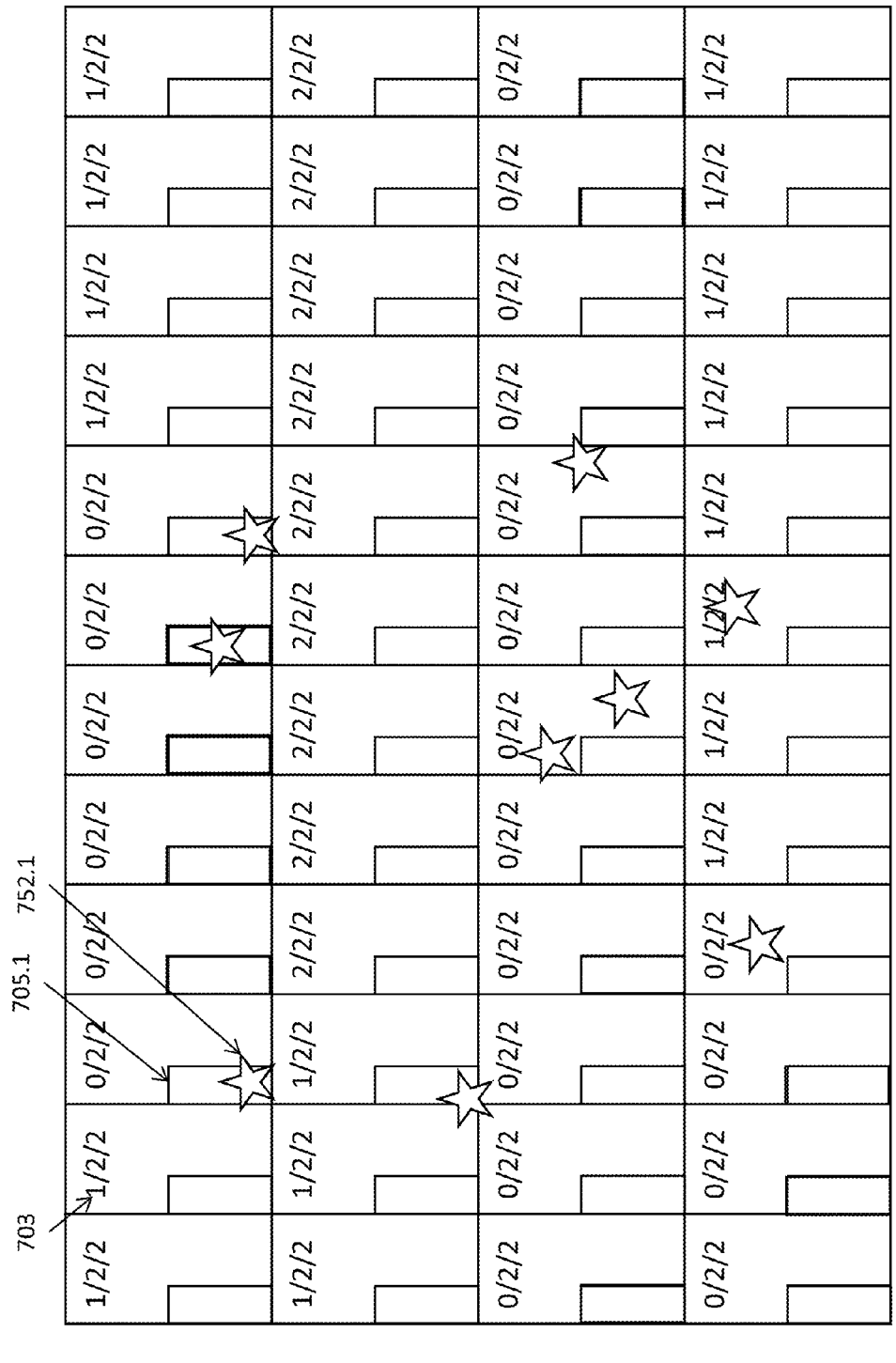
FIGS. 7A, 7B and 7C depict pin placement of pins that connect to an east end of the macro in accordance with one or more embodiments of the present disclosure.
Figure 7B:
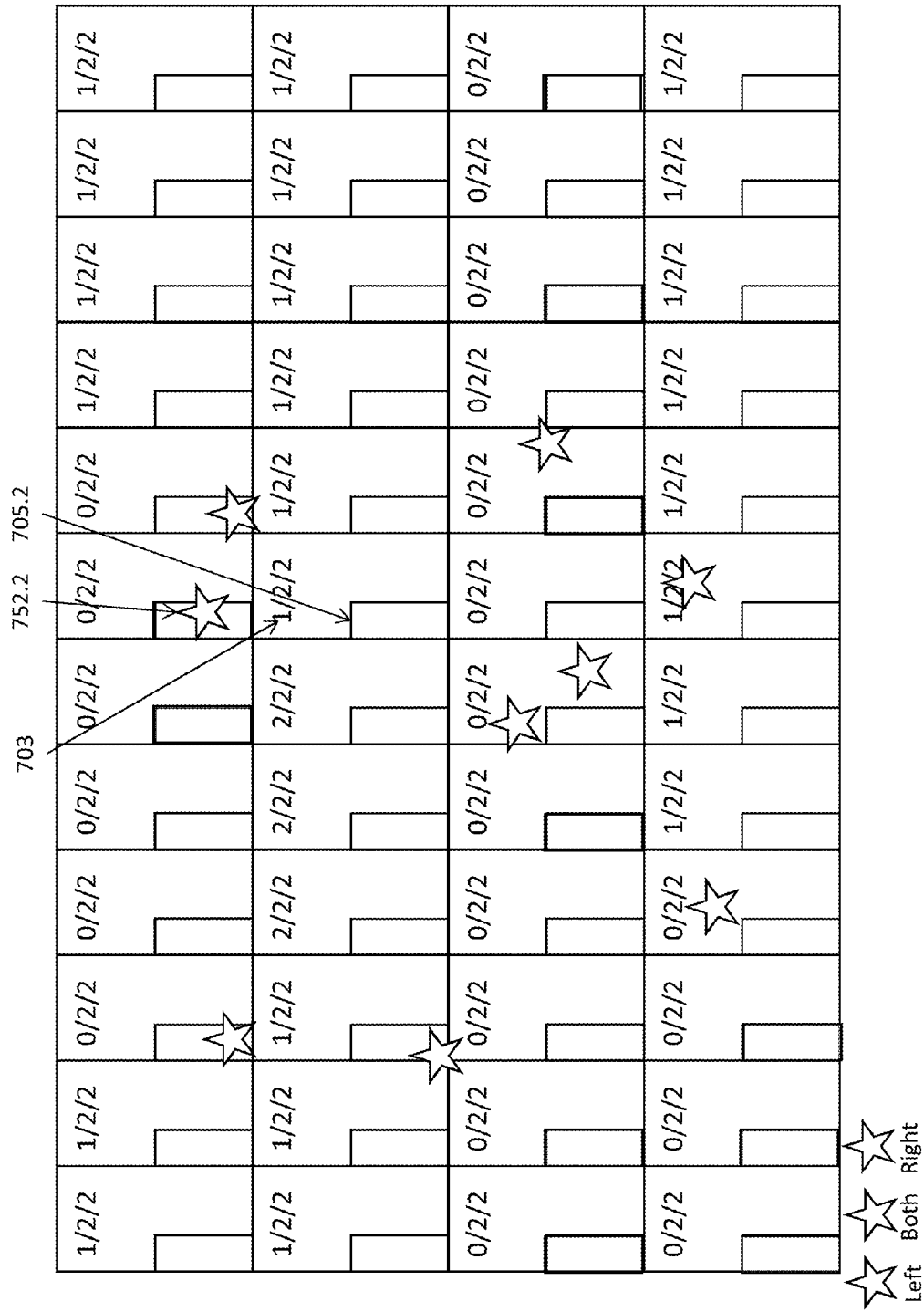
Figure 7C:
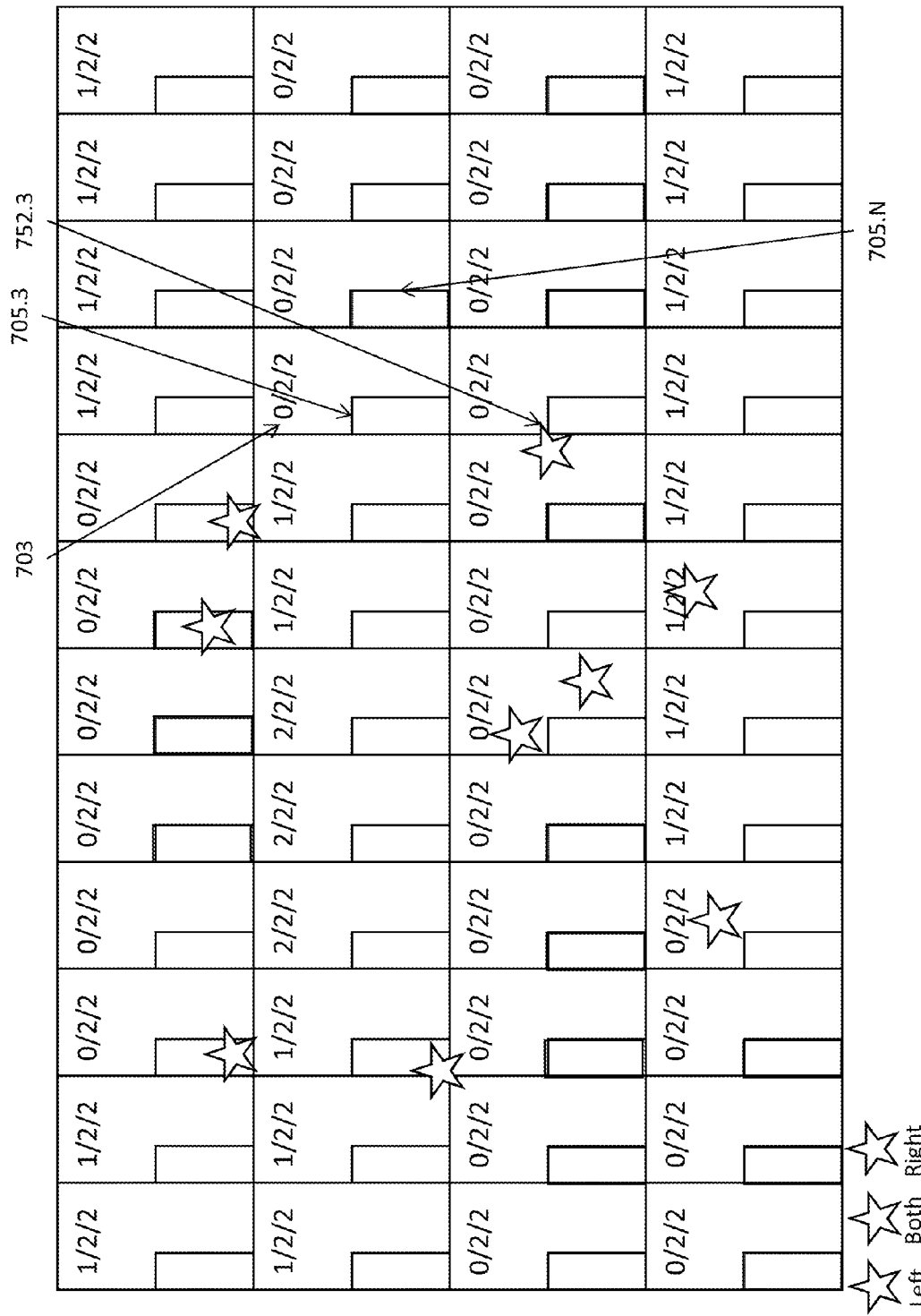

FIGS. 7A-7C depict pin placement of pins that connect to an east end of the macro in accordance with one or more embodiments of the present disclosure.

For example, FIG. 7A shows the placement of a seventh pin 705.1 in a slot nearest an ideal pin placement 752.1. The routing resources 703 of this slot are adjusted to 0/2/2 which indicates that this slot's routing resources on this metal layer are completely saturated. Further, the routing resources 703 of the slots right of the seventh pin 705.1 are also adjusted to either 0/2/2 or 1/2/2 as shown where the grayed out slots indicate that those can no longer support any pins or routing wires.

FIG. 7B shows the placement of an eighth pin 705.2 in a slot nearest the ideal pin location 752.2. As shown the selected pin location is not the slot at which the ideal pin location 752.2 is found because the ideal slot does not have any routing resources available to support a pin placement. Thus, a slot directly below that does still have sufficient resources for the pin as well as resources in adjacent slots for the signal wire is selected. The routing resource 703 of this slot is adjusted to 1/2/2. Further, the routing resources of the slots to the right of the eighth pin 705.2 are also decremented to 1/2/2 to account for the signal wire that will connect the eighth pin 705.2 to the east end.

FIG. 7C shows the placement of a ninth pin 705.3 in a slot nearest the ideal pin location 752.3. As shown the selected pin location is not the slot at which the ideal pin location 752.3 is found because the ideal slot does not have any routing resources available to support a pin placement. Thus, a slot directly above that does still have sufficient resources for the pin 705.3 as well as resources in adjacent slots 705.N for the signal wire is selected. The routing resource 703 of this slot is adjusted to 0/2/2. Further, the routing resources of the slots 705/N to the right of the ninth pin 705.3 are also decremented to 0/2/2 to account for the signal wire that will connect the ninth pin 705.2 to the east end.

Figure 8A:
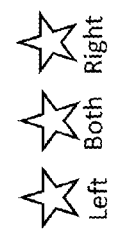
FIG. 8A depicts a final pin arrangement in accordance with one more embodiments of the present disclosure.

FIG. 8A depicts a final pin arrangement in accordance with one more embodiments of the present disclosure. Particularly, as shown the first through ninth pins are shown in slots that are either the same slots as the ideal location or within a slot nearest the ideal location were resources were next available.

Figure 8B:
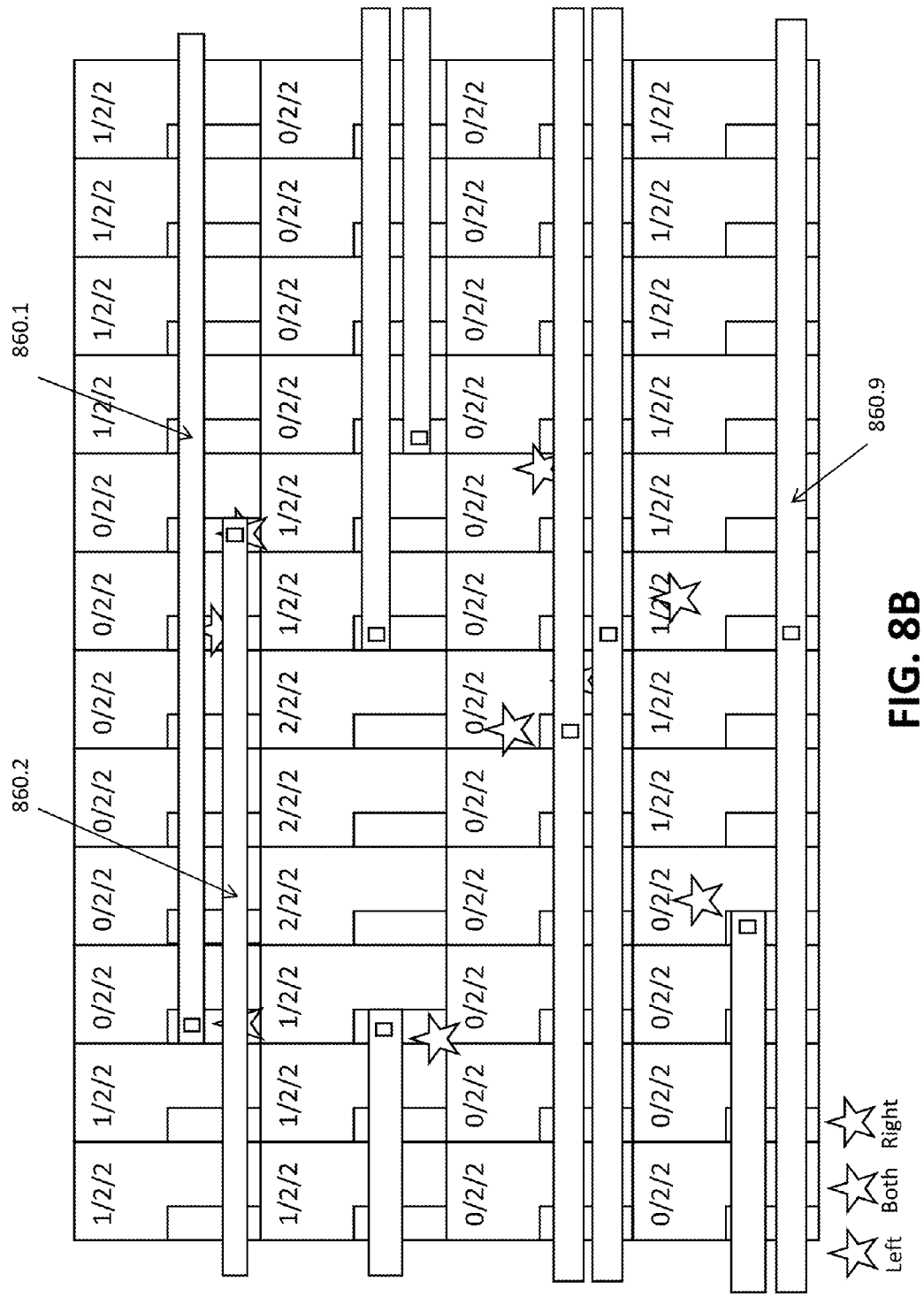
FIG. 8B depicts pins in a final pin arrangement and the connections to the east and west end of the macro in accordance with one or more embodiments of the disclosure.

FIG. 8B depicts pins in the final pin arrangement as well as connections to the east and west end of the macro block in accordance with one or more embodiments of the disclosure. For example, a signal wire 860.1 is shown connecting a pin to the east end of the macro block only. Further, a signal wire 860.2 is shown connecting a pin to the west end of the macro block only. Also, signal wire 860.9 is shown connected a pin to both the east end and the west end of the macro block. Additional signal wires as shown that connect each pin to the east end, the west end, or both.

According to another embodiment, the connection pattern is determined by a separate design program that is commonly referred to as the signal router. This program takes the pin location and several other factors into account when determining the ideal connection pattern.

Figure 9:
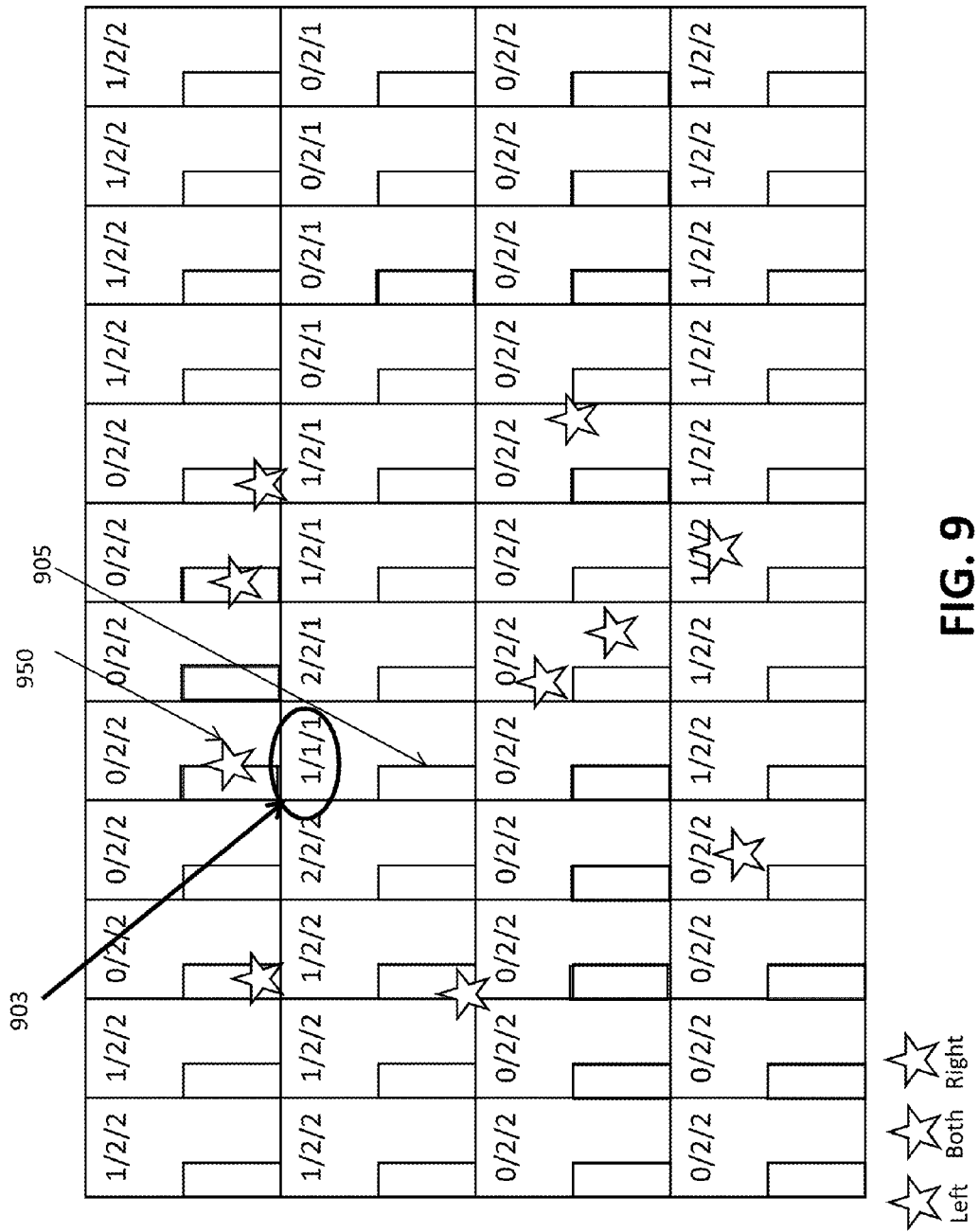
FIG. 9 depicts place of another pin on a different metal layer from other pins being placed in accordance with one or more embodiments of the present disclosure.

FIG. 9 depicts placement of another pin 905 on a different metal layer from other pins (first pin through ninth pin) being placed in accordance with one or more embodiments of the present disclosure. Particularly, as shown a pin 905 with wiring access defined to be on a metal layer that is two wiring layers up from the layer where the other pins and signal wires were placed. As shown the ideal pin location 950 was in a slot that did not have first metal layer resource available. Thus, even though there were resources available on the third metal layer for the pin 905, the pin could not be placed on this slot because the pin needs a resource on each layer between the access layer and the assigned layer for pin 905. Thus, another slot is selected that is nearest the ideal pin location 950 that still has the necessary routing resources available. Particularly, as shown a slot south of the ideal placement is selected. The selected slot routing resources are then adjusted to account for the pin 905 placement. Specifically, the routing resource 903 is adjusted to 1/1/1 to indicate the usage of the each layer between the access layer and the assigned layer for pin. Further, pin 905 is provided with parent information indicating that it should connect to the east end of the macro block only. Thus, the routing resource values for each slot to the right are also adjusted to account for the signal wiring that will be placed. Particularly, as shown the third value is decrement by one in each slot.

Figure 10:
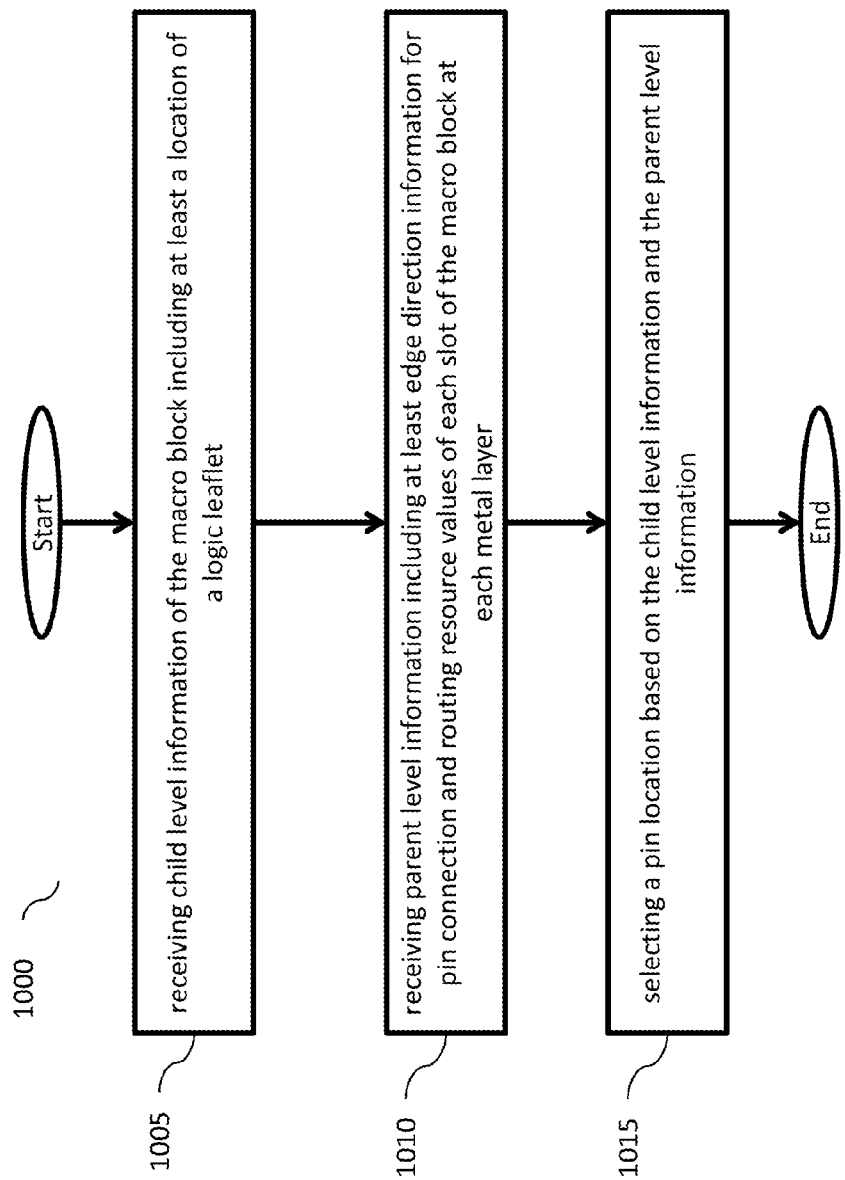
FIG. 10 depicts a flow diagram of a method of interior pinning in a macro block of an integrated circuit in accordance with one or more embodiments of the present disclosure.

FIG. 10 depicts a flow diagram of a method 1000 of interior pinning in a macro block of an integrated circuit in accordance with one or more embodiments of the present disclosure. The method 1000 includes receiving child level information of the macro block including at least a location of a logic leaflet (operation 1005). The method 1000 also includes receiving parent level information including at least edge direction information for pin connection and routing resource values of each slot of the macro block at each metal layer (operation 1010). Further, the method 1000 includes selecting pin location(s) based on the child level information and the parent level information (operation 1015).

According to one or more embodiments selecting the pin location(s) includes selecting the pin location for one or more pins that is configured to connect to both east end and west end of the macro block of the integrated circuit. Next selecting the pin locations for pins that connect to only one end is done next. For example pin location for pins that connect to the east end can be selected next or pins location for pins that connected to the west end can be selected next. According to other embodiments the directions can be interchanged in the above description with "north" and "south" in place of "east" and "west" depending on the wiring direction of the wiring layer as well as possibly the orientation and wiring requirements of the particular macro and overall device.

According to one embodiment, selecting pin locations for all pins that are configured to connect to the west end of the macro block using a metal layer that extends left from the pin to the west end includes identifying pins that are configured to connect to the west end and identifying a distance from the west end to each pin. Selecting pin locations also includes generating a pin order, wherein the pins are listed furthest pin from the west end first to nearest pin to the west end last and selecting pin locations for the pins in the order listed in the pin order.

According to one embodiment, selecting pin locations for all pins that are configured to connect to the east end of the macro block using a metal layer that extends right from the pin to the east end includes identifying pins that are configured to connect to the east end and identifying a distance from the east end to each pin. Selecting pin locations also includes generating a pin order, wherein the pins are listed further pin from the east end first to nearest pin to the east end last, and selecting pin locations for the pins in the order listed in the pin order.

Further, according to one or more embodiments, selecting the pin location based on the child level information and the parent level information can include other operations. For example, selecting can include determining an ideal pin placement based on the logic leaflet location, wherein the ideal pin placement is directly above the logic leaflet location. Selecting can also include determining a nearest available pin slot in relation to the ideal pin placement, wherein the nearest available pin slot is an empty slot with available routing resources between the slot and the macro edge that the pin to be placed requires that is nearest the ideal pin placement. Finally, selecting can then include selecting the nearest available pin slot as the pin location for the pin to be placed.

According to one or more embodiments, the method can further include computing placement of the pin in the pin location; and wiring the pin to a desired edge of the macro block. Further, according to other embodiments, the method includes tracking routing resource values of the child level information as pin assignments are made. According to an embodiment, tracking includes decrementing routing resource count for the slot where the pin is located. This can include decrementing the resource value of each metal layer between the pin and the logic leaflet including the metal layer the pin is located on. Tracking can also include decrementing routing resource count of all slots along a connection path between the pin and the edge of the macro block the pin is configured to connect with. This can include decrementing the resource value in each slot along a path to the edge from the pin.

According to one or more embodiments, the pinning solution gives parent level information, such as the routing information to the LBS so that the LBS Synthesis can balance that information with the child level information when placing pins in slots.

Technical effects and benefits include optimized pin location for both a parent and child level of a macro block and overall integrated circuit the macro block is part of. Further, an advantage provided by one or more embodiments is that both the child and parent concerns are taken into account when selecting pin locations. Specifically, one or more embodiments provide optimized hierarchical crossings, by using the child and parent information to adjust interior pins. Further, according to one or more embodiments, because the parent level may get more high-performance metal, the ability for timing critical signals using an interior pin over an edge pin can be improve timing goals and metrics.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the embodiments in the form disclosed. Many modifications and variations will be apparent to those of ordinary skill in the art without departing from the scope of the disclosure. The embodiments were chosen and described in order to best explain the principles of the disclosure and the practical application, and to enable others of ordinary skill in the art to understand various embodiments with various modifications as are suited to the particular use contemplated.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present invention are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accordingly, the present disclosure is not to be seen as limited by the foregoing description, but is only limited by the scope of the appended claims.

What is claimed is:

1. A computer implemented method for improving interior pinning in a macro block of an integrated circuit, the method comprising:
receiving, by a computer child level information of the macro block including at least a location of a logic leaflet in the integrated circuit;
receiving, by the computer, parent level information including at least edge direction information for pin connection and routing resource values of each slot of the macro block at each metal layer in the integrated circuit, wherein the logic leaflet defines a connecting point for a pin in the integrated circuit; and
selecting, by the computer, a pin location for the pin in the integrated circuit based on the child level information and the parent level information, which comprises determining an ideal pin placement, wherein the pin location is associated with the ideal pin placement.

2. The computer implemented method of claim 1, wherein selecting the pin location based on the child level information and the parent level information comprises:
selecting the pin location for the pin that is configured to connect to both east end and west end of the macro block of the integrated circuit.

3. The computer implemented method of claim 2, wherein selecting the pin location based on the child level information and the parent level information further comprises:
selecting pin locations for all pins that are configured to connect to the west end of the macro block using a metal layer that extends left from the pin to the west end.

4. The computer implemented method of claim 3, wherein selecting pin locations for all pins that are configured to connect to the west end of the macro block using a metal layer that extends left from the pin to the west end comprises:
identifying pins that are configured to connect to the west end;
identifying a distance from the west end to each pin;
generating a pin order, wherein the pins are listed furthest pin from the west end first to nearest pin to the west end last; and
selecting pin locations for the pins in the order listed in the pin order.

5. The computer implemented method of claim 2, wherein selecting the pin location based on the child level information and the parent level information further comprises:
selecting pin locations for all pins that are configured to connect to the east end of the macro block using a metal layer that extends right from the pin to the east end.

6. The computer implemented method of claim 3, wherein selecting pin locations for all pins that are configured to connect to the east end of the macro block using a metal layer that extends right from the pin to the east end comprises:
identifying pins that are configured to connect to the east end;
identifying a distance from the east end to each pin;
generating a pin order, wherein the pins are listed further pin from the east end first to nearest pin to the east end last; and
selecting pin locations for the pins in the order listed in the pin order.

7. The computer implemented method of claim 1, wherein selecting the pin location based on the child level information and the parent level information comprises:
determining the ideal pin placement based on the logic leaflet location, wherein the ideal pin placement is directly above the logic leaflet location;
determining a nearest available pin slot in relation to the ideal pin placement, wherein the nearest available pin slot is an empty slot with available routing resources between the slot and a macro edge that the pin to be placed requires that is nearest the ideal pin placement; and
selecting the nearest available pin slot as the pin location for the pin to be placed.

8. The computer implemented method of claim 1, further comprising:
computing placement of the pin in the pin location; and
computing wiring of the pin to a desired edge of the macro block.

9. The computer implemented method of claim 1, further comprising:
tracking routing resource values of the child level information as pin assignments are made.

10. The computer implemented method of claim 9, wherein tracking routing resource values of the child level information as pin assignments are made comprises:
decrementing routing resource count for the slot where the pin is located; and
decrementing routing resource count of all slots along a connection path between the pin and the edge of the macro block the pin is configured to connect with.

11. The computer implemented method of claim 10, wherein decrementing routing resource count for the slot where the pin is located comprises:
decrementing a resource value of each metal layer between the pin and the logic leaflet including the metal layer the pin is located on.

12. The computer implemented method of claim 10, wherein decrementing routing resource count of all slots along a connection path between the pin and the edge of the macro block the pin is configured to connect with comprises:
decrementing a resource value in each slot along a path to the edge from the pin.

13. A system for improving interior pinning in a macro block of an integrated circuit, the system comprising:
a memory having computer readable instructions; and
a processor configured to execute the computer readable instructions, the computer readable instructions comprising:
receiving, by the processor, child level information of the macro block including at least a location of a logic leaflet in the integrated circuit;
receiving, by the processor, parent level information including at least edge direction information for pin connection and routing resource values of each slot of the macro block at each metal layer in the integrated circuit, wherein the logic leaflet defines a connecting point for a pin in the integrated circuit; and
selecting a pin location for the pin in the integrated circuit based on the child level information and the parent level information.

14. The system of claim 13, wherein the computer readable instruction of selecting the pin location based on the child level information and the parent level information further comprises:
selecting the pin location for the pin that is configured to connect to both east end and west end of the macro block of the integrated circuit;
selecting pin locations for all pins that are configured to connect to the west end of the macro block using a metal layer that extends left from the pin to the west end, comprising:
identifying pins that are configured to connect to the west end;
identifying distance from the west end to each pin;
generating a pin order, wherein the pins are listed further pin from the west end first to nearest pin to the west end last; and
selecting pin locations for the pins in the order listed in the pin order;
selecting pin locations for all pins that are configured to connect to the east end of the macro block using a metal layer that extends right from the pin to the east end, comprising:
identifying pins that are configured to connect to the east end;
identifying distance from the east end to each pin;
generating a pin order, wherein the pins are listed further pin from the east end first to nearest pin to the east end last; and
selecting pin locations for the pins in the order listed in the pin order.

15. The system of claim 13, wherein the computer readable instruction of selecting the pin location based on the child level information and the parent level information further comprises:
determining the ideal pin placement based on the logic leaflet location, wherein the ideal pin placement is directly above the logic leaflet location;
determining a nearest available pin slot in relation to the ideal pin placement, wherein the nearest available pin slot is an empty slot with available routing resources between the slot and a macro edge that the pin to be placed requires that is nearest the ideal pin placement; and
selecting the nearest available pin slot as the pin location for the pin to be placed.

16. The system of claim 13, further comprising:
computing placement of the pin in the pin location; and
computing wiring of the pin to a desired edge of the macro block.

17. The system of claim 13, further comprising:
tracking routing resource values of the child level information as pin assignments are made, wherein tracking comprises:
decrementing routing resource count for the slot where the pin is located; and
decrementing routing resource count of all slots along a connection path between the pin and the edge of the macro block the pin is configured to connect with.

18. A computer program product for improving interior pinning in a macro block of an integrated circuit, the computer program product comprising a computer readable storage medium having program instructions embodied therewith, the program instructions executable by a processor to cause the processor to:
receive, by the processor, child level information of the macro block including at least a location of a logic leaflet in the irate grated circuit;
receive, by the processor, parent level information including at least edge direction information for pin connection and routing resource values of each slot of the macro block at each metal layer in the integrated circuit, wherein the logic leaflet defines a connecting point for a pin in the integrated circuit; and
select, by the processor, a pin location for the pin in the integrated circuit based on the child level information and the parent level information.

19. The computer program product of claim 18, further comprising program instructions executable by a processor to cause the processor to:
select the pin location for a pin that is configured to connect to both east end and west end of the macro block of the integrated circuit;
select pin locations for all pins that are configured to connect to the west end of the macro block using a metal layer that extends left from the pin to the west end, comprising:
identifying pins that are configured to connect to the west end;
identifying distance from the west end to each pin;

generating a pin order, wherein the pins are listed further pin from the west end first to nearest pin to the west end last; and selecting pin locations for the pins in the order listed in the pin order;

select pin locations for all pins that are configured to connect to the east end of the macro block using a metal layer that extends right from the pin to the east end, comprising:

identifying pins that are configured to connect to the east end;

identifying distance from the east end to each pin;

generating a pin order, wherein the pins are listed further pin from the east end first to nearest pin to the east end last; and selecting pin locations for the pins in the order listed in the pin order.

20. The computer program product of claim 18, further comprising program instructions executable by a processor to cause the processor to:

determine an ideal pin placement based on the logic leaflet location, wherein the ideal pin placement is directly above the logic leaflet location;

determine a nearest available pin slot in relation to the ideal pin placement, wherein the nearest available pin slot is an empty slot with available routing resources between the slot and the macro edge that the pin to be placed requires that is nearest the ideal pin placement;

select the nearest available pin slot as the pin location for the pin to be placed; and track routing resource values of the child level information as pin assignments are made, wherein tracking includes:

decrementing routing resource count for the slot where the pin is located; and decrementing routing resource count of all slots along a connection path between the pin and the edge of the macro block the pin is configured to connect with.

* * * * *